(12) United States Patent
Onoda et al.

(10) Patent No.: US 8,817,133 B2
(45) Date of Patent: Aug. 26, 2014

(54) IMAGING APPARATUS, IMAGING METHOD AND PROGRAM THEREOF

(75) Inventors: Takashi Onoda, Ome (JP); Osamu Nojima, Hachioji (JP)

(73) Assignee: Casio Computer Co., Ltd., Tokyo (JP)

(*) Notice: Subject to any disclaimer, the term of this patent is extended or adjusted under 35 U.S.C. 154(b) by 531 days.

(21) Appl. No.: 13/089,098

(22) Filed: Apr. 18, 2011

(65) Prior Publication Data

US 2011/0193996 A1 Aug. 11, 2011

(30) Foreign Application Priority Data

Nov. 14, 2006 (JP) .................................. 2006-308015
Mar. 12, 2007 (JP) .................................. 2007-061780

(51) Int. Cl.
*H04N 5/76* (2006.01)

(52) U.S. Cl.
USPC .................................................... 348/231.99

(58) Field of Classification Search
CPC ............ H04N 3/1525; G06F 17/30265; H01L 27/14856; G06K 7/10752
USPC .................................................... 348/231.99
See application file for complete search history.

(56) References Cited

U.S. PATENT DOCUMENTS

| 6,020,920 | A | 2/2000 | Anderson |
| 6,233,015 | B1 | 5/2001 | Miller et al. |
| 7,620,304 | B2 | 11/2009 | Larner et al. |
| 7,639,281 | B2 | 12/2009 | Sudo |
| 7,800,677 | B2 | 9/2010 | Abe |
| 2003/0189647 | A1* | 10/2003 | Kang ...................... 348/207.99 |
| 2003/0227551 | A1* | 12/2003 | Kudo ...................... 348/207.99 |
| 2005/0157198 | A1 | 7/2005 | Larner et al. |
| 2005/0168592 | A1 | 8/2005 | DeMoor |
| 2006/0164536 | A1* | 7/2006 | Abe ........................ 348/333.01 |
| 2008/0198243 | A1 | 8/2008 | Kijima |

FOREIGN PATENT DOCUMENTS

| JP | 3-198482 A | 8/1991 |
| JP | 4-322580 A | 11/1992 |
| JP | 11-088761 A | 3/1999 |
| JP | 11-239315 A | 8/1999 |

(Continued)

OTHER PUBLICATIONS

Japanese Office Action dated Oct. 19, 2009, and English translation thereof, issued in counterpart Japanese Application No. 2006-308015.

(Continued)

*Primary Examiner* — Daniel M Pasiewicz
*Assistant Examiner* — Mark Monk
(74) *Attorney, Agent, or Firm* — Holtz Holtz Goodman & Chick PC

(57) ABSTRACT

In a digital camera 1, when a lagged-timing is recorded (Yes at Step S9), from the frame image picked up when the shutter is fully depressed, a frame image picked up at a timing equivalent to the lagged-timing is displayed (Step S10). When the cross-shaped key is operated before the SET key is operated, the displayed frame image is changed based on the operation (Step S12 and Step S13). Next, when the SET key is operated, the displayed frame image is recorded. In addition, a lag between the timing at which the recorded frame image is picked up and the timing at which the frame image picked up when the shutter is fully depressed is picked up is recorded (Step S15).

18 Claims, 13 Drawing Sheets

(56) References Cited

FOREIGN PATENT DOCUMENTS

| | | |
|---|---|---|
| JP | 2002-271673 A | 9/2002 |
| JP | 2003-274280 A | 9/2003 |
| JP | 2004-220679 A | 8/2004 |
| JP | 2004-247983 A | 9/2004 |
| JP | 2006-140892 A | 6/2006 |
| JP | 2006-203811 A | 8/2006 |

OTHER PUBLICATIONS

Japanese Office Action dated Apr. 14, 2011 (and English translation thereof) in counterpart Japanese Application No. 2007-061780.

* cited by examiner

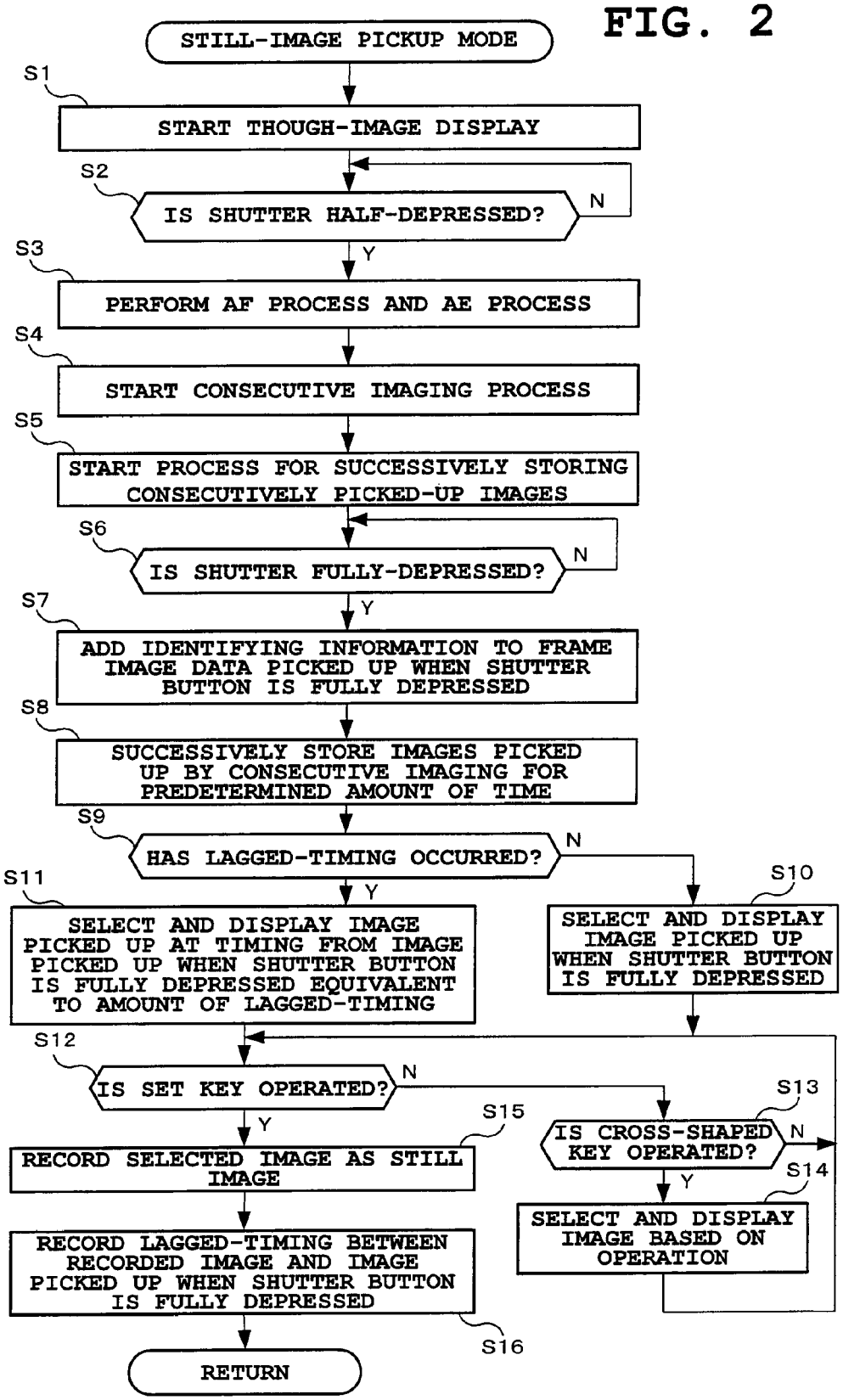

FIG. 9A

| IMAGING SCENE \ FRAME RATE | ~10fps | ~20fps | ~30fps | |
|---|---|---|---|---|
| NONE | ...ms | ...ms | ...ms | ... |
| IMAGING PEOPLE | ...ms | ...ms | ...ms | ... |
| IMAGING SCENERY | ...ms | ...ms | ...ms | ... |
| IMAGING CHILDREN | ...ms | ...ms | ...ms | ... |
| IMAGING SPORTING EVENT | ...ms | ...ms | ...ms | ... |
| ⋮ | ⋮ | ⋮ | ⋮ | ... |

FIG. 9B

| | |
|---|---|
| IMAGING BATTER | ...ms |
| IMAGING PITCHER | ...ms |
| IMAGING SHOT | ...ms |
| IMAGING TENNIS SERVE | ...ms |
| ⋮ | ⋮ |

FIG. 9C

| | |
|---|---|
| SMALL MOVEMENT | ...ms |
| MEDIUM MOVEMENT | ...ms |
| LARGE MOVEMENT | ...ms |

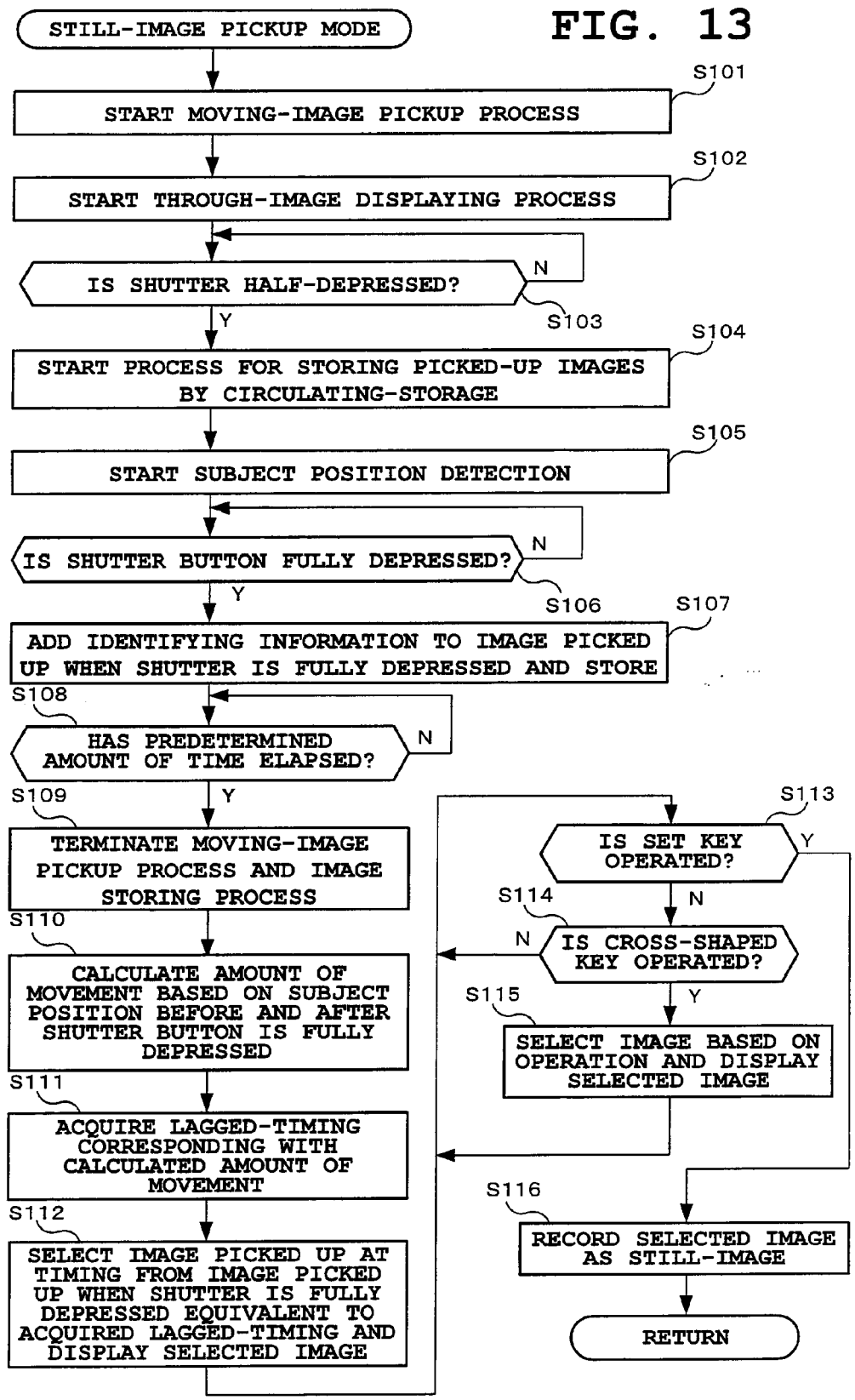

IMAGING APPARATUS, IMAGING METHOD AND PROGRAM THEREOF

CROSS-REFERENCE TO RELATED APPLICATION

This is a Divisional of U.S. application Ser. No. 11/978,902, filed Oct. 30, 2007, which application is based upon and claims the benefit of priority from prior Japanese Patent Application No. 2006-308015, filed Nov. 14, 2006, and No. 2007-061780, filed Mar. 12, 2007, the entire contents of all of which are incorporated herein by reference.

BACKGROUND OF THE INVENTION

1. Field of the Invention

The present invention relates to an imaging apparatus, an imaging method, and a program thereof.

2. Description of the Related Art

When a user judges that a perfect moment to capture an image (referred to, hereinafter, as the "perfect moment") has arrived and presses a shutter button on an imaging apparatus, such as an electronic camera, the imaging apparatus performs a still-image pickup process based on the shutter button operation.

However, a slight lag occurs between the timing judged to be the perfect moment and the timing at which the shutter button is depressed. Therefore, the user cannot acquire an image taken at the desired timing.

In light of problems such as this, a technology including a time-lag measuring mode and a still-image pickup mode has been developed (refer to, for example, Japanese Patent Laid-Open (Kokai) Publication No. 2002-271673). In the time-lag measuring mode, an amount of time from when a lamp is lit until when the shutter button is depressed is measured. In the still-image pickup mode, an image going back only by the measured amount of time from when the shutter button is fully depressed is recorded.

However, according to the conventional technology, the time lag occurring when the shutter button is depressed is required to be measured in the time-lag measuring mode. Therefore, time-lag measurement was bothersome.

SUMMARY OF THE INVENTION

The present invention has been conceived in light of the foregoing situations, and is to provide an imaging apparatus, an imaging method and a program thereof allowing a time lag that occurs when a shutter button is depressed to be easily acquired.

In accordance with one aspect of the present invention, there is provided an imaging apparatus comprising: a consecutive imaging controlling section for consecutively imaging a subject; a timing indicating section for allowing a user to indicate an arbitrary timing; an image acquiring section for acquiring a plurality of pieces of image data picked up by the consecutive imaging controlling section based on the timing indicated by the timing indicating section; a selecting section for selecting an arbitrary piece of image data from among the pieces of image data acquired by the image acquiring section based on a user operation; a lagged-timing information acquiring section for acquiring lagged-timing information indicating a lag between a timing at which the image data selected by the selecting section is picked up by the consecutive imaging controlling section and a timing indicated by the timing indicating section; and a controlling section for performing a predetermined process using the lagged-timing information acquired by the lagged-timing information acquiring section and image data acquired by the image acquiring section.

In accordance with another aspect of the present invention, there is provided an imaging method comprising: a consecutive imaging controlling step of consecutively imaging a subject; a timing indicating step of allowing a user to indicate an arbitrary timing; an image acquiring step of acquiring a plurality of pieces of image data picked up at the consecutive imaging controlling step based on the timing indicated at the timing indicating step; a selecting step of selecting an arbitrary piece of image data from among the pieces of image data acquired at the image acquiring step based on a user operation; a lagged-timing information acquiring step of acquiring lagged-timing information indicating a lag between a timing at which the image data selected at the selecting step is picked up at the consecutive imaging controlling step and a timing indicated at the timing indicating step; and a controlling step of performing a predetermined step using the lagged-timing information acquired at the lagged-timing information acquiring step and image data acquired at the image acquiring step.

In accordance with another aspect of the present invention, there is provided a computer-readable storage medium having a program for an imaging apparatus stored thereon that is executable by a computer, comprising: a consecutive imaging controlling process for consecutively imaging a subject; a timing indicating process for allowing a user to indicate an arbitrary timing; an image acquiring process for acquiring a plurality of pieces of image data picked up in the consecutive imaging controlling process based on the timing indicated in the timing indicating process; a selecting process for selecting an arbitrary piece of image data from among the pieces of image data acquired in the image acquiring process based on a user operation; a lagged-timing information acquiring process for acquiring lagged-timing information indicating a lag between a timing at which the image data selected in the selecting process is picked up in the consecutive imaging controlling process and a timing indicated in the timing indicating process; and a controlling process for performing a predetermined process using the lagged-timing information acquired in the lagged-timing information acquiring process and image data acquired in the image acquiring process.

In accordance with another aspect of the present invention, there is provided an imaging apparatus comprising: a consecutive imaging controlling section for consecutively imaging a subject; a timing indicating section for allowing a user to indicate an arbitrary timing; an image acquiring section for acquiring a plurality of pieces of image data picked up by the consecutive imaging controlling section based on the timing indicated by the timing indicating section; an acquiring section for acquiring an imaging situation; a lagged-timing information acquiring section for acquiring lagged-timing information based on the imaging situation acquired by the acquiring section; and a controlling section for performing a predetermined process using the lagged-timing information acquired by the lagged-timing information acquiring section and image data acquired by the image acquiring section.

In accordance with another aspect of the present invention, there is provided an imaging method comprising: a consecutive imaging controlling step of consecutively imaging a subject; a timing indicating step of allowing a user to indicate an arbitrary timing; an image acquiring step of acquiring a plurality of pieces of image data picked up at the consecutive imaging controlling step based on the timing indicated by the timing indicating step; an acquiring step of acquiring an imaging situation; a lagged-timing information acquiring step of acquiring lagged-timing information based on the imaging situation acquired at the acquiring step; and a controlling step of performing a predetermined step using the lagged-timing information acquired at the lagged-timing information acquiring step and image data acquired at the image acquiring step.

In accordance with another aspect of the present invention, there is provided a computer-readable storage medium having a program for an imaging apparatus stored thereon that is executable by a computer, comprising: a consecutive imaging controlling process for consecutively imaging a subject; a timing indicating process for allowing a user to indicate an arbitrary timing; an image acquiring process for acquiring a plurality of pieces of image data picked up in the consecutive imaging controlling process based on the timing indicated in the timing indicating process; an acquiring process for acquiring an imaging situation; a lagged-timing information acquiring process for acquiring lagged-timing information based on the imaging situation acquired in the acquiring process; and a controlling process for performing a predetermined process using the lagged-timing information acquired in the lagged-timing information acquiring process and image data acquired in the image acquiring process.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a flowchart of an operation performed by the digital camera according to the first embodiment;

FIG. 9A is a diagram explaining a lagged-timing table recorded in a memory;

FIG. 9B is a diagram explaining a lagged-timing table recorded in the memory;

FIG. 9C is a diagram explaining a lagged-timing table recorded in the memory;

FIG. 13 is a flowchart of an operation performed by the digital camera according to the third embodiment.

DETAILED DESCRIPTION OF THE PREFERRED EMBODIMENTS

An example of the imaging apparatus of the present invention applied to a digital camera will hereinafter be described in detail with reference to the preferred embodiments shown in the accompanying drawings.

A. First Embodiment

A-1. Configuration of the Digital Camera

Figure 1:
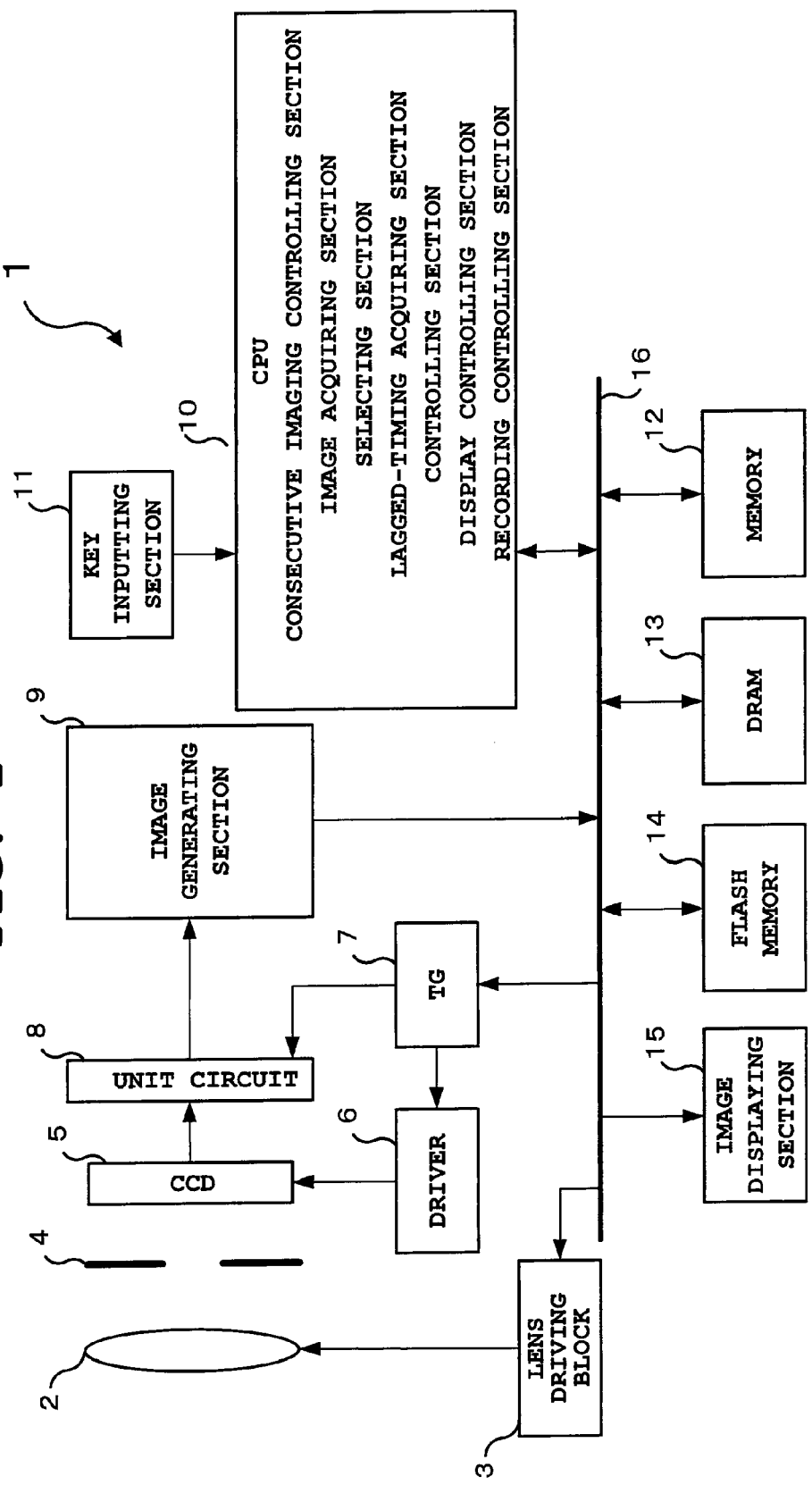
FIG. 1 is a block diagram of a digital camera according to a first embodiment of the present invention.

FIG. 1 is a block diagram showing an overall electrical schematic of a digital camera 1 according to an embodiment.

The digital camera 1 includes an imaging lens 2, a lens driving block 3, an aperture 4, a charge-coupled device (CCD) 5, a driver 6, a timing generator (TG) 7, a unit circuit 8, an image generating section 9, a central processing unit (CPU) 10, a key inputting section 11, a memory 12, a dynamic random-access memory (DRAM) 13, a flash memory 14, an image displaying section 15, and a bus 16.

The imaging lens 2 includes a focusing lens, a zoom lens, and the like composed from a plurality of lens groups (not shown). The lens driving block 3 is connected to the imaging lens 2. The lens driving block 3 includes a focus motor, a zoom motor, a focus motor driver, and a zoom motor driver (not shown). The focus motor and the zoom motor respectively drive the focusing lens and the zoom lens along an optical axis direction. The focus motor driver and the zoom motor driver drive the focus motor and the zoom motor in adherence to control signals sent from the CPU 10.

The aperture 4 includes a driving circuit (not shown). The driving circuit operates the aperture 4 in adherence to a control signal sent from the CPU 10.

The aperture 4 refers to a mechanism for controlling an amount of light entering the digital camera 1 from the imaging lens 2.

The driver 6 drives the CCD 5. The CCD 5 performs photoelectric conversion on the light intensity of each color among the red, green, and blue (RGB) values of a subject image, at a constant frequency. The CCD 5 outputs the converted light intensity to the unit circuit 8 as an imaging signal. The CPU 10 controls operation timings of the driver 6 and the unit circuit 8, via the TG 7. The CCD 5 has color filters in a Bayer arrangement and also functions as an electronic shutter. The CPU 10 controls a shutter speed of the electronic shutter, via the driver 6 and the TG 7.

The TG 7 is connected to the unit circuit 8. The unit circuit 8 includes a correlated double sampling (CDS) circuit, an automatic gain control (AGC) circuit, and an analog-to-digital (A/D) converter. The CDS circuit performs a correlated double sampling of the imaging signal outputted from the CCD 5 and holds the sampled imaging signal. The AGC circuit performs an automatic gain control on the sampled imaging signal. The A/D converter converts the analog imaging signal on which the automatic gain control has been performed to a digital signal. The imaging signal outputted from the CCD 5 is sent to the image generating section 9 as the digital signal, via the unit circuit 8.

The image generating section 9 performs processes, such as a γ-correction process and a white balance process, on image data sent from the unit circuit 8. The image generating section 9 also generates a luminance and color difference signal (YUV data) and sends the image data of the generated luminance and color difference signal to the CPU 10. In other words, the image generating section 9 performs image processing on the image data outputted from the CCD 5.

The CPU 10 is a one-chip microcomputer controlling each section of the digital camera 1.

Here, the CPU 10 actualizes a function for consecutively imaging a subject and picking up a plurality of pieces of image data (consecutive imaging controlling section), a function for acquiring the pieces of consecutively picked-up image data (image acquiring section), a function for selecting an arbitrary piece of image data from among the acquired pieces of consecutively picked-up image data based on user operations (selecting section), and a function for acquiring lagged-timing information indicating a lag between a timing at which the image data selected by the user has been picked up and a timing at which an instruction for imaging has been given (lagged-timing information acquiring section). The CPU 10 also actualizes a function for performing a predetermined process using the acquired lagged-timing information and the pieces of consecutively picked-up data (controlling section), a function for displaying, for example, the pieces of consecutively picked-up image data (display controlling section), and a function for recording the pieces of consecutively picked-up image data (recording controlling section).

The key inputting section 11 includes a plurality of operation keys, such as a shutter button, a power ON/OFF key, a mode switching key, a cross-shaped key, and a SET key. The shutter button can be half-depressed and fully-depressed. The key inputting section 11 outputs an operation signal to the CPU 10, based on a key operation performed by the user. The key inputting section 11 functions as a timing indicating section, the selecting section, a designating section, and an instructing section of the invention.

The memory 12 stores a control program required for the CPU 10 to control each section and required data. The CPU 10 operates in adherence to the program.

The DRAM 13 is used as a buffer memory that temporarily stores the image data sent to the CPU 10 after being picked up by the CCD 5. The DRAM 13 is also used as a working memory of the CPU 10.

The flash memory 14 (recording section) is a recording medium storing compressed image data.

The image displaying section 15 includes a color liquid crystal display (LCD) and a driving circuit for the color LCD. When the digital camera 1 is an imaging wait state, the subject imaged by the CCD 5 is displayed as a through-image. When a recorded image is reproduced, a recorded image that has been read from the flash memory 14 and expanded is displayed.

A-2. Operations of the Digital Camera 1

An operation performed by the digital camera 1 according to the first embodiment will be described with reference to a flowchart in FIG. 2.

When the digital camera 1 is set to the still-image pickup mode by the user operating the mode switching key in the key inputting section 11, the CPU 10 starts a so-called through-image display (Step S1). In the through-image display, the CPU 10 starts imaging at a predetermined frame rate (such as 30 frames per second) using the CCD 5. The CCD 5 successively picks up images. The buffer memory (DRAM 13) stores the image data of the luminance and color difference signals successively generated by the image generating section 9. The image displaying section 15 displays the stored image data.

Next, the CPU 10 judges whether the shutter button is half-depressed (Step S2). The CPU 10 makes the judgment based on whether an operation signal corresponding to a half-depression operation of the shutter button is sent from the key inputting section 11.

At this time, the user half-depresses the shutter button when the user expects that a perfect moment will soon arrive.

When the CPU 10 judges at Step S2 that the shutter button is not half-depressed, the CPU 10 remains at Step S2 until the shutter button is half-depressed. When the CPU 10 judges that the shutter button is half-depressed, the CPU 10 performs an auto-exposure (AE) process and an auto-focus (AF) process (Step S3).

In the AE process, appropriate shutter speed and aperture value are automatically decided based on the luminance of the subject, thereby determining an amount of received light. Specifically, an appropriate exposure value is calculated based on a luminance component of an image data that has been most recently picked up. The aperture value and the shutter speed are decided based on the calculated appropriate exposure value.

In the AF process, the focusing lens is moved to a focused lens position at which the subject is in focus. Various methods, such as a contrast detecting method and a phase contrast method can be performed as an AF processing method. Here, the contrast detecting method is used to perform the AF process.

Next, at Step S4, the CPU performs a consecutive imaging process (consecutive imaging controlling section). The consecutive imaging process refers to a process for consecutively picking up still-images. Here, an imaging interval of the consecutive imaging process is 60 shots per second. The subject is consecutively imaged at a 1/60-second interval.

Figure 3A:
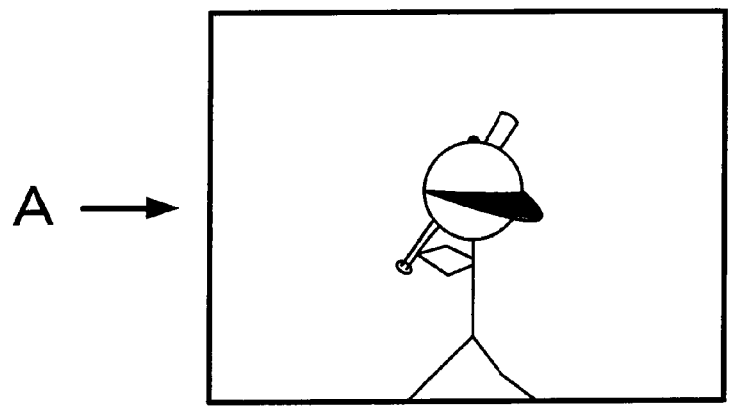
FIG. 3A is a diagram of an image displayed in an image displaying section at a certain timing.
Figure 3B:
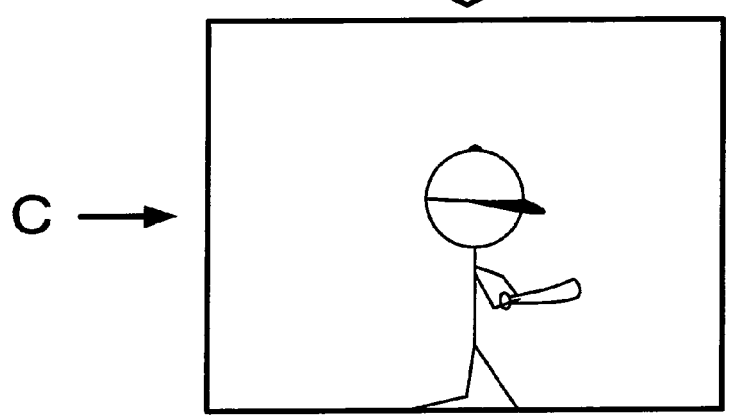
FIG. 3B is a diagram of an image displayed in the image displaying section at a certain timing.
Figure 3C:
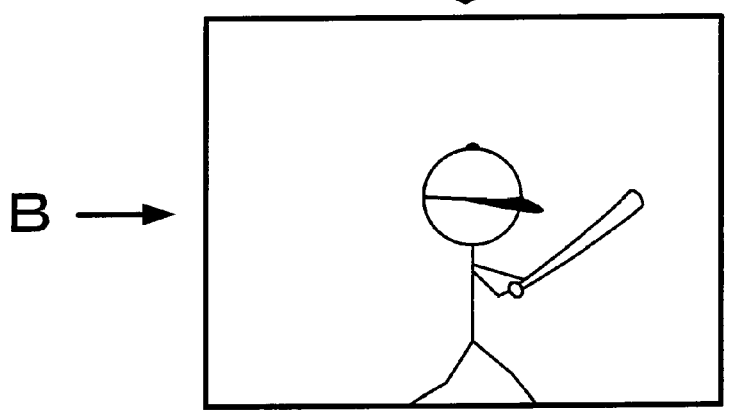
FIG. 3C is a diagram of an image displayed in the image displaying section at a certain timing.

FIG. 3A to FIG. 3C show images displayed in the image displaying section 15 at certain timings. The timings of the images indicate a passage of time, such as from A to C to B.

FIG. 3A shows a first image that has been picked up through the consecutive imaging process, immediately after the shutter button is half-depressed, and displayed.

Next, at Step S5, the CPU 10 performs a process for successively storing the pieces of consecutively picked-up image data in a first storing area of the buffer memory (image acquiring section).

The pieces of image data that have been successively picked up at this time are stored in the buffer memory using circulating-storage. In the circulating-storage, the pieces of picked-up image data are successively stored and accumulated until the first storing area runs out of free space. When the first storing area runs out of free space, a new piece of picked-up image data is written over the oldest piece of image data among the plurality of pieces of image data stored in the buffer memory. As a result, the pieces of image data from that picked up most recently to that picked up a certain amount of time earlier are stored.

The image data can be stored within the entire buffer memory using circulating-storage rather than the image data being stored in the first storing area of the buffer memory using circulating-storage.

Next, the CPU 10 judges whether the shutter button is fully-depressed (Step S6). The CPU 10 makes the judgment based on whether an operation signal corresponding to a full-depression operation of the shutter button is sent from the key inputting section 11.

At this time, the user fully depresses the shutter button upon judging that the perfect moment has arrived.

At Step S6, when the CPU 10 judges that the shutter button is not fully depressed, the CPU 10 remains at Step S6 until the shutter button is fully depressed. At the same time, when the CPU 10 judges at Step S6 that the shutter button is fully depressed, the CPU 10 adds identifying information to the image data picked up when the shutter button is fully depressed and stores the image data (Step S7). The identifying information allows image data picked up when the shutter button is fully depressed to be identified.

Next, at Step S8, the CPU 10 continues consecutive imaging for a predetermined amount of time after the full-depression of the shutter button. The CPU 10 then stores the pieces of picked-up image data in a second storing area of the buffer memory (image acquiring section). As a result, a plurality of pieces of image data picked up before and after the shutter button is fully depressed can be stored.

At this time, the second storing area of the buffer memory has enough storage capacity to store the pieces of image data picked up over the predetermined amount of time in the consecutive imaging process.

Here, storage capacity of the first storing area and the predetermined amount of time after the full-depression of the shutter button during which consecutive imaging is performed are set such that the number of pieces of image data recorded before the shutter button is fully depressed and the number of pieces of image data picked up after the shutter button is fully depressed are roughly the same. As a result, the image data of the perfect moment can be stored even when the user fully presses the shutter button before the perfect moment or after the perfect moment.

The number of pieces of image data picked up before the shutter button is fully depressed and the number of pieces of image data picked up after the shutter button is fully depressed are not necessarily required to be the same. At Step S5, the pieces of image data acquired through consecutive imaging can be stored within the entire buffer memory. In this case, when the buffer memory becomes full, a new piece of picked-up image data is written over the oldest piece of image data among the plurality of pieces of image data stored in the buffer memory.

Next, the CPU 10 judges whether lagged-timing is present (Step S9). The CPU 10 makes the judgment on whether the lagged-timing is present based on whether lagged-timing information is stored in a lagged-timing storing area of the memory 11. The lagged-timing information will be described hereafter. Simply stated, however, the lagged-timing refers to a lag in the timings between when the user wishes to pick up an image (the perfect moment) and when the user actually fully depresses the shutter button. In other words, the lagged-timing information refers to a time lag.

In other words, a time lag occurs from when the user judges that the perfect moment has arrived until when the user actually fully depresses the shutter button, although the time lag varies from person to person.

Figure 4:
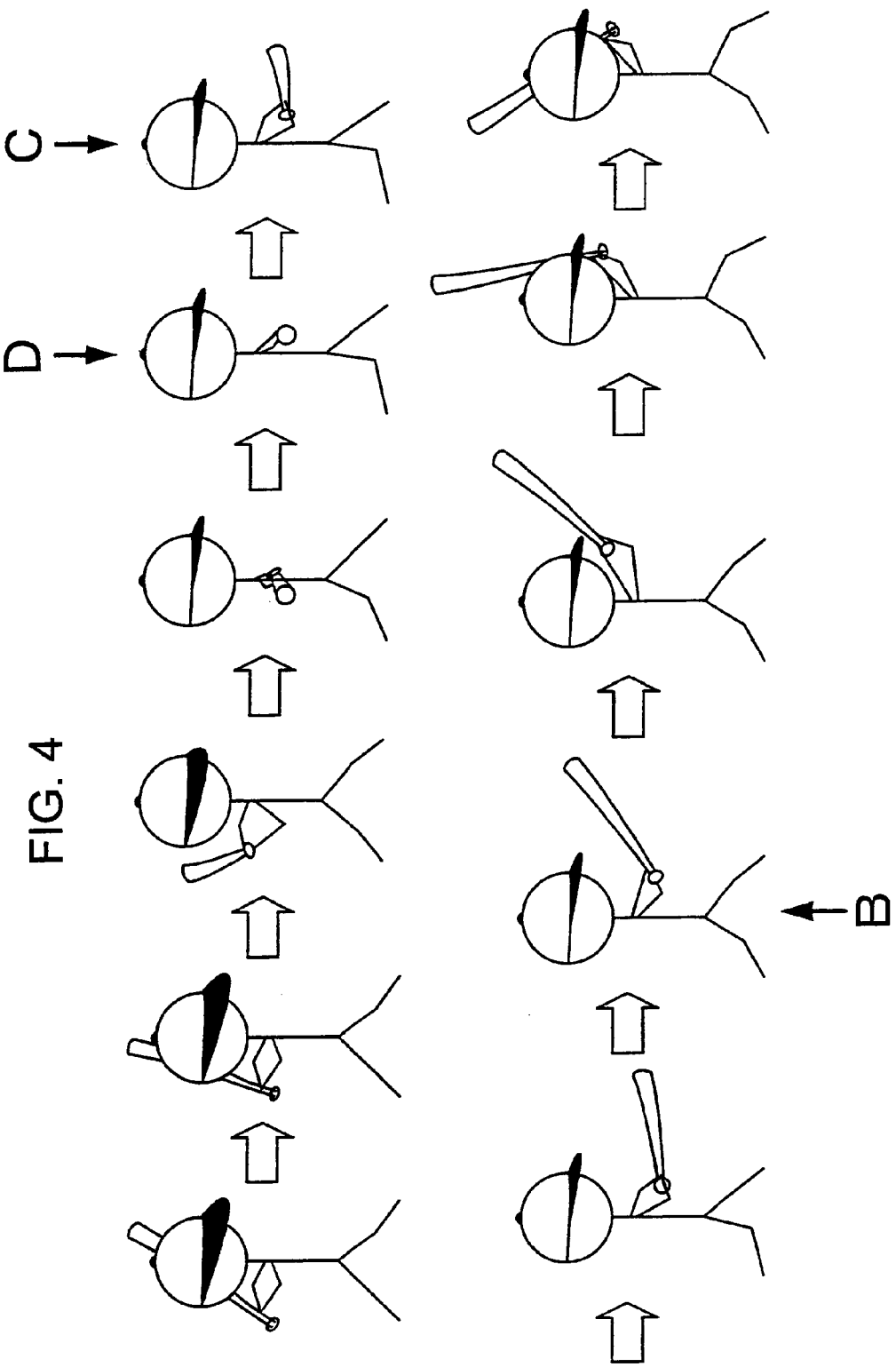
FIG. 4 is a diagram of images from each piece of image data stored in a buffer memory.

For example, even when the user considers an image such as that shown in FIG. 3C (indicated by C in FIG. 4) to be that of the perfect moment, the image that is picked up when the user actually fully depresses the shutter button is an image such as that shown in FIG. 3B (indicated by B in FIG. 4). Thus, a time lag occurs.

When the subject moves quickly, the user may fully depress the shutter button before the perfect moment.

For example, even when the user considers an image such as that indicated by C in FIG. 4 to be that of the perfect moment, the user may predict the movement of the subject and fully depress the shutter button before the perfect moment because the movement is too fast. The image that is picked up when the user actually fully depresses the shutter button may be an image such as that indicated by D in FIG. 4. A lag occurs between the perfect moment and the timing at which the shutter button is actually fully depressed.

When the CPU 10 judges at Step S9 that the lagged-timing information is not stored, the CPU 10 proceeds to Step S10. At Step S10, the CPU 10 automatically selects the image data picked up when the shutter button is fully depressed among the plurality of pieces of image data stored in the buffer memory. In other words, the CPU 10 selects the image data to which the identifying information is attached among the pieces of image data stored in the buffer memory. The image displaying section 15 displays the selected image by itself (in other words, singularly displayed or individually displayed) (controlling section and display controlling section). The CPU 10 then proceeds to Step S12. In other words, when the lagged-timing information is not stored, the image data picked up when the shutter button is fully depressed is first displayed by itself as a recommended image.

At the same time, when the CPU 10 judges that the lagged-timing is present at Step S9, the CPU 10 proceeds to Step S11. At Step S11, the CPU 10 automatically selects image data picked up at a timing from the image data picked up when the shutter button is fully depressed, namely the image data to which the identifying information is attached, equivalent to the amount of lagged-timing, among the plurality of pieces of image data stored in the buffer memory. The image displaying section 15 displays the selected image data (controlling section and display controlling section). The CPU 10 then proceeds to Step S12. In other words, when the lagged-timing information is stored, the image data picked up at a timing from the image picked up when the shutter button is fully depressed equivalent to the amount of lagged-timing is displayed first as the recommended image.

As a result, the image data thought to be picked up at the desired imaging timing can be displayed first.

Here, FIG. 4 is a diagram of images from each piece of image data stored in the buffer memory.

In FIG. 4, a person swinging a bat is successively imaged.

The image indicated by C in FIG. 4 shows image data picked up when the user judges that the perfect moment has arrived. The images indicated by B and D in FIG. 4 show image data picked up when the user actually fully depresses the shutter button. The image indicated by B in FIG. 4 and that in FIG. 3C are picked up at the same timing. The image indicated by C in FIG. 4 and that in FIG. 3B are picked up at the same timing.

The image indicated by B in FIG. 4 shows image data picked up when the user fully depresses the shutter button after the perfect moment. The image indicated by D in FIG. 4 shows image data picked up when the user fully depresses the shutter button before the perfect moment.

When the lagged-timing information is not stored in the lagged-timing storing area, the CPU 10 selects the image data picked up when the shutter button is actually fully depressed. In other words, the CPU 10 selects the image data of the image indicated by B in FIG. 4. The image displaying section 15 displays the selected image data by itself. When the lagged-timing information is stored in the lagged-timing storing area, the CPU 10 selects image data based on the lagged-timing information and the image data picked up when the shutter button is fully depressed, and the image displaying section 15 displays the selected image data. For example, when 1/30 seconds earlier is stored as the lagged-timing, the image data picked up 1/30 seconds before the image data picked up when the shutter button is fully depressed is selected and displayed. In other words, the image data indicated by C in FIG. 4 is selected and displayed. Here, the pieces of image data are consecutively picked up at a 1/60-second interval. Therefore, the image data 1/30 seconds earlier refers to image data two frames earlier.

In continuation of the explanation of the flowchart in FIG. 2, when the CPU 10 proceeds to Step S12, the CPU 10 judges whether the user has operated the SET key. The CPU 10 makes the judgment based on whether an operation signal corresponding to an operation of the SET key is sent from the key inputting section 11.

At this time, the user operates the SET key upon judging that the user wishes to record the selected and displayed image data as still-image data.

When the CPU 10 judges at Step S12 that the user has not operated the SET key, the CPU 10 judges whether the user has operated the cross-shaped key (Step S13). The CPU 10 makes the judgment based on whether an operation signal corresponding to an operation of the cross-shaped key is sent from the key inputting section 11.

When the CPU 10 judges at Step S13 that the user has operated the cross-shaped key, the CPU 10 newly selects image data based on the operation. The image displaying section 15 displays the selected image data by itself (Step S14). The CPU 10 then returns to Step S12.

For example, when the user operates a "↓" key of the cross-shaped key, the CPU 10 newly selects and displays image data picked up after the selected and displayed image data. When the user operates a "↑" key of the cross-shaped key, the CPU 10 newly selects and displays image data picked up before the selected and displayed image data.

At the same time, when the CPU 10 judges at Step S13 that the user has not operated the cross-shaped key, the CPU 10 returns directly to Step S12.

Therefore, the user can change the selected and displayed image data by operating the cross-shaped key, and can identify the images of the pieces of consecutively picked-up image data. Furthermore, the user can select the image data that the user truly wishes to pickup and record from among the identified images.

At the same time, when the CPU 10 judges at Step S12 that the user has operated the SET key, the CPU 10 proceeds to Step S15. The flash memory 14 records the selected image data as a still-image (recording controlling section).

Next, at Step S16, the CPU 10 selects the recorded image data as the image picked up at a best timing (the perfect moment) (selecting section). The CPU 10 stores information indicating the lag in the pickup timings between the selected image data and the image data picked up when the shutter button is fully depressed in the lag-timing storing area of the memory 12 (lagged-timing information acquiring section). The information is stored as the lagged-timing information. At this time, when lagged-timing information is already stored in the lagged-timing storing area, the stored lagged-timing information is overwritten and the new lagged-timing information is stored. As a result, the latest lagged-timing information is stored. When the next imaging is performed, image data is selected and displayed at Step S11, via Step S9, based on the amount of lag indicated by the new lagged-timing information.

For example, when the user operates the SET key while the image in FIG. 3C (indicated by C in FIG. 4) is displayed in the image displaying section 15, the displayed image data in FIG. 3C is recorded as the still-image. The information indicating 1/30 seconds earlier, which is the lagged-timing between the recorded image data and the image data picked up when the shutter button is fully depressed, is also recorded.

As described above, according to the first embodiment, when the lagged-timing information is recorded, among the pieces of image data acquired through consecutive imaging, from the image data picked up when the shutter button is fully depressed, the image data picked up at a timing equivalent to the amount of lagged-timing is displayed first as the recommended image. When the lagged-timing information is not recorded, the image data picked up when the shutter button is fully depressed is displayed. Therefore, the image data thought to be that picked up at the timing at which the user wishes to perform imaging can be displayed first.

The lagged-timing information of the image data selected by the user and recorded and the image data picked up when the shutter button is fully depressed, among the plurality of pieces of image data acquired through consecutive imaging, is recorded. Therefore, the time lag between the timing at which the instruction for imaging is actually given and a best imaging timing can be easily acquired.

A-4. Variation Examples according to the First Embodiment

The following variations of the first embodiment are possible.

(1) According to the first embodiment, at Step S16, when the lagged-timing information is already stored in the lagged-timing storing area, the stored lagged-timing information is overwritten and the new lagged-timing information is stored. However, the new lagged-timing information can be stored without the stored lagged-timing information being overwritten. As a result, lagged-timing history is clear.

In addition, in this case, at Step S9, the image data can be automatically selected through use of a mean value of previous lagged-timings (such as a mean value of all stored lagged-timings or a mean value of lagged-timings of a predetermined frequency). In other words, the image data, from the image data picked up when the shutter button is fully depressed, namely from the image data to which the identifying information is added, picked up at a timing equivalent to the amount of the mean value of the previous lagged-timings is automatically selected. As a result, the image data selected as the recommended image becomes image data closer to the perfect moment.

(2) According to the first embodiment, when the CPU 10 judges at Step S12 that the user has not operated the SET key, the CPU 10 judges at Step S13 whether the user has operated the cross-shaped key. When the CPU 10 judges that the user has operated the cross-shaped key, the CPU 10 selects the image data based on the cross-shaped key operation and displays the selected image data. However, the CPU 10 can automatically and successively select the pieces of image data acquired through consecutive imaging and display the selected pieces of image data. In other words, the CPU 10 can automatically switch the display of the pieces of image data picked up through consecutive imaging. The plurality of pieces of picked-up image data can be repeatedly displayed until the user operates the SET key. When the user operates the SET key, the CPU 10 can proceed to Step S15 and record the image data displayed (selected) when the user operates the SET key. In the automatic switching display, the pieces of image data can be displayed at a longer interval (slow display) than the imaging interval at which the pieces of image data are picked up. When the imaging interval of the pieces of consecutively picked-up image data is 1/60 seconds, the interval at which the pieces of image data are displayed is, for example, 1/10 seconds.

In the automatic switching display in this case as well, as a rule, the CPU 10 performs the process at Step S11 when a lagged-timing is present. When the lagged-timing is not present, the CPU 10 performs the process at Step S11 after performing the process at Step S10, or in other words, after the recommended image is displayed first. However, the recommended image is not required to be displayed first. For example, the pieces of image data can be successively displayed starting with the oldest piece of image data among the plurality of pieces of image data stored in the buffer memory.

As a result, the user is not inconvenienced. The pieces of image data can also be enjoyed as a moving image.

(3) In the variation example (2) described above, when pieces of image data picked up at a timing near the timing at which the image data displayed at Step S11 or Step S10 (in other words, the recommended image data based on the timing at which the shutter button is fully depressed and the stored lagged-timing) is picked up are displayed in performance of the automatic switching display, the pieces of image data picked up near the timing at which the recommended image data is picked up can be displayed at a speed (reduced rate) slower than the reproduction speed of the pieces of image data picked up at timings other than near the timing at which the recommended image is picked up.

As a result, the pieces of image data picked up at a timing near the timing at which the user wishes to perform imaging can be displayed slowly. The user can more easily select the image data picked up at the best timing.

When the pieces of image data picked up at a timing near the timing at which the image data displayed at Step S11 or Step S10 (in other words, the image data based on the timing at which the shutter button is fully depressed and the stored lagged-timing) is picked up are displayed, rather than the image data being reproduced at a speed (slow reproduction) slower than the reproduction speed of the pieces of image data picked up at timings other than near the timing at which the recommended image is picked up, a notification that an image is picked up at a timing near the best timing can be displayed in the image displaying section 15. Alternatively, the user can be notified that the image is picked up at a timing near the best timing by a sound. As a result, the user can recognize that the image data picked up at the best timing is being displayed and can more easily select the image data picked up at the best timing.

When the image data picked up near the timing at which the image data based on the timing at which the shutter button is fully depressed and the stored lagged-timing is picked up is displayed, the image data can be displayed at a speed slower than the reproduction speed of image data picked up at timings other than near the timing at which the recommended image data is picked up. In addition, the user can be notified that the image data is picked up at a timing near the best timing by a sound or the like.

(4) According to the first embodiment and in the variation example (1) described above, the pieces of image data picked up during the consecutive imaging process are individually displayed. However, the pieces of image data can be simultaneously shown and the selected image data can be distinctly displayed.

In this case, when the CPU 10 judges at Step S9 that the lagged-timing is present, the image displaying section 15 simultaneously displays the plurality of pieces of image data picked up during the consecutive imaging process. From the image data picked up when the shutter button is fully depressed, namely from the image data to which the identifying information is attached, the CPU 10 also automatically selects the image data picked up at a timing equivalent to the amount of lagged-timing as the recommended data. The selected image data is distinctly displayed and cursor selection is performed (a cursor is selected to indicate the image data to be distinctly displayed).

When the CPU 10 judges at Step S9 that the lagged-timing is not present, the CPU 10 automatically selects the image data picked up when the shutter button is fully depressed. The CPU distinctly displays the selected image data as the recommended data and performs cursor selection.

When the user operates the cross-shaped key at Step S13, the CPU 10 selects the image based on the operation. The CPU 10 distinctly displays the selected image data and performs cursor selection.

As a result, the image data picked up at the best timing can be selected from the plurality of pieces of displayed image data.

(5) According to the first embodiment and in the variation examples (1) to (4) described above, when the user half-depresses the shutter button, the pieces of consecutively picked-up image data are successively stored at Step S5. When the user fully-depresses the shutter button at Step S6, consecutive imaging is performed at Step S8 for a predetermined amount of time and the pieces of picked-up image data are stored. However, when the user fully depresses the shutter button, the CPU 10 can terminate consecutive imaging and proceed directly to Step S9. In this case, the pieces of image data picked up before the image data picked up when the shutter button is fully depressed are stored. This is particularly advantageous when the user fully depresses the shutter button after the timing at which the user wishes to perform imaging.

Rather than the pieces of consecutively picked-up image data being successively stored when the user half-depresses the shutter button, the pieces of consecutively picked-up image data can be successively stored for the first time when the user fully depresses the shutter button. In this case, the pieces of image data picked up after the image data picked up when the shutter button is fully depressed are stored. This is particularly advantageous when the user fully depresses the shutter button before the timing at which the user wishes to perform imaging.

As a result, unnecessary pieces of image data are not stored.

(6) In the variation example (5) described above, the user can select mode, such as early depression mode, delayed depression mode, and normal mode. When the user selects the normal mode, the pieces of image data picked up from when the shutter button is half-depressed can be stored as according to the above-described embodiment. When the user selects the early depression mode, the pieces of image data picked up after the shutter button is fully depressed can be stored. When the user selects the delayed depression mode, the pieces of image data picked up from when the shutter button is half-depressed can be stored. The storage of image data stops when the user fully depresses the shutter button. In other words, the pieces of image data picked up before the shutter button is fully depressed can be stored.

In this case, the lagged-timing information for each of the early depression mode, the delayed depression mode, and the normal mode can be stored because the timing at which the user fully depresses the shutter button differs in each mode.

(7) According to the first embodiment and in the variation examples (1) to (6), when the user operates the SET key, the image data currently being selected at Step S15 is recorded as a still-image. However, the image data can be automatically recorded based on the currently stored lagged-timing information.

Specifically, when the CPU 10 judges at Step S9 in FIG. 2 that the lagged-timing is present, among the plurality of pieces of image data stored in the buffer memory through consecutive imaging, from the image data picked up when the shutter button is fully depressed, namely from the image data to which the identifying information is attached, the CPU 10 automatically selects the image data picked up at a timing equivalent to the amount of lagged-timing. The CPU 10 stores the selected image data in the flash memory 14.

At the same time, when the CPU 10 judges at Step S9 that the lagged-timing is not present, from among the plurality of pieces of image data stored in the buffer memory through consecutive imaging, the CPU 10 automatically selects the image data picked up when the shutter button is fully depressed. In other words, from among the pieces of image data stored in the buffer memory, the CPU 10 selects the image data to which the identifying information is attached. The CPU 10 stores the selected image data in the flash memory 14.

As a result, the image picked up at the perfect moment can be acquired based on the lagged-timing.

(8) According to the first embodiment and the variation examples (1) to (7), when the user operates the SET key, the currently selected image data is recorded as a still-image at Step S15. When the same image is selected and displayed for a predetermined amount of time, the selected and displayed image data can be automatically recorded.

In this case, the judgment made at Step S12 in FIG. 2 is judgment on whether the same image data is selected and displayed for the predetermined amount of time.

(9) According to the first embodiment and the variation examples (1) to (8), when the user operates the SET key at Step S15, the selected image data is recorded as the still-image. However, rather than only the selected image data being recorded, a plurality of pieces of image data picked up through consecutive imaging can be recorded as a single group of data. In this case, best image information (differentiating information) is associated with the image data selected (displayed) when the user operates the SET key at Step S15 and the best image information is recorded. The best image information indicates that the image is picked up at the best timing. At this time, the identifying information associated with the image data picked up when the shutter button is fully depressed and recorded is not recorded in the flash memory 14.

As indicated in the variation example (7) described above, when the image data is automatically recorded, a plurality of pieces of image data picked up through consecutive imaging is automatically recorded. From the image data picked up when the shutter button is fully depressed, namely from the image data to which the identifying information is attached, the best image information is associated with the image data picked up at a timing equivalent to the amount of lagged-timing and recorded. As indicated in the variation example (8) described above, when the image data selected and displayed for the predetermined amount of time is automatically recorded, the best image information is associated with the image data selected and displayed for the predetermined amount of time and recorded. In this case as well, the identifying information associated with the image data picked up when the shutter button is fully depressed is not recorded in the flash memory 14.

The plurality of pieces of image data recorded as a single group can be all pieces of image data stored in the buffer memory through consecutive imaging. Alternatively, the plurality of pieces of image data can be predetermined pieces of image data among all pieces of image data stored in the buffer memory. However, the image data selected when the user operates the SET key is required to be included in the recorded predetermined pieces of image data.

The plurality of pieces of image data picked up through consecutive imaging is recorded as a single group. However, the plurality of pieces of image data is not required to be recorded as a single group. The plurality of pieces of image data can also be recorded as a plurality of groups.

In this case, when the group is selected in reproduction mode, the CPU 10 displays the plurality of pieces of image data belonging to the group in the image displaying section 15 based on the associated best image information (image display controlling section).

For example, the image data with which the best image information is associated and recorded is displayed first, among the recorded image data. When the user operates the cross-shaped key, the CPU 10 displays the image based on the key operation.

When the recorded image data is displayed through automatic switching display, as in the variation examples (2) and (3) described above, the image data with which the best image information is associated and recorded can be displayed first. However, the image data is not required to be displayed first. The image data can be displayed by slow reproduction (displaying the image data at an interval longer than the imaging interval at which consecutive imaging is performed). However, the image data is not required to be displayed by slow reproduction.

The pieces of image data picked up at a timing near the timing at which the image data with which the best image information is associated is picked up can be displayed at a speed (reduced rate) slower than the reproduction speed of the pieces of image data picked up at timings other than near the timing at which the image data with which the best image information is associated is picked up. Alternatively, when the image data picked up at a timing near the timing at which the image data with which the best image information is associated is displayed, the user can be notified that the image is picked up at a timing near the best timing by a sound.

Furthermore, the image data pieces of image data picked up at a timing near the timing at which the image data with which the best image information is associated is picked up can be displayed at a speed (reduced rate) slower than the reproduction speed of the pieces of image data picked up at timings other than near the timing at which the image data with which the best image information is associated is picked up. In addition, the user can be notified that the image is picked up at a timing near the best timing by a sound.

As a result, the user can easily identify the image picked up at the best timing in a series of image reproductions. The user's interest can be enhanced.

(10) A set of assembled image data can be generated based on the plurality of pieces of image data acquired through consecutive imaging. In the set of assembled image data, the images from the plurality of pieces of image data are arranged (assembled image data generating section).

The set of assembled image data can be generated such that the image data selected when the user operates the SET key at Step S12 is the main image. Alternatively, the set of assembled image data can be generated such that the image data, from the image data picked up when the shutter button is fully depressed, picked up at a timing equivalent to the amount of lagged-timing is the main image data.

As described in the variation example (8), the set of assembled image data can be generated such that the image data selected and displayed for a predetermined amount of time is the main image. Alternatively, when the set of assembled image data is generated based on the plurality of pieces of image data recorded as a single group in the variation example (9), the set of assembled image data can be generated such that the image data with which the best image information is associated and recorded is the main image.

Figure 5:
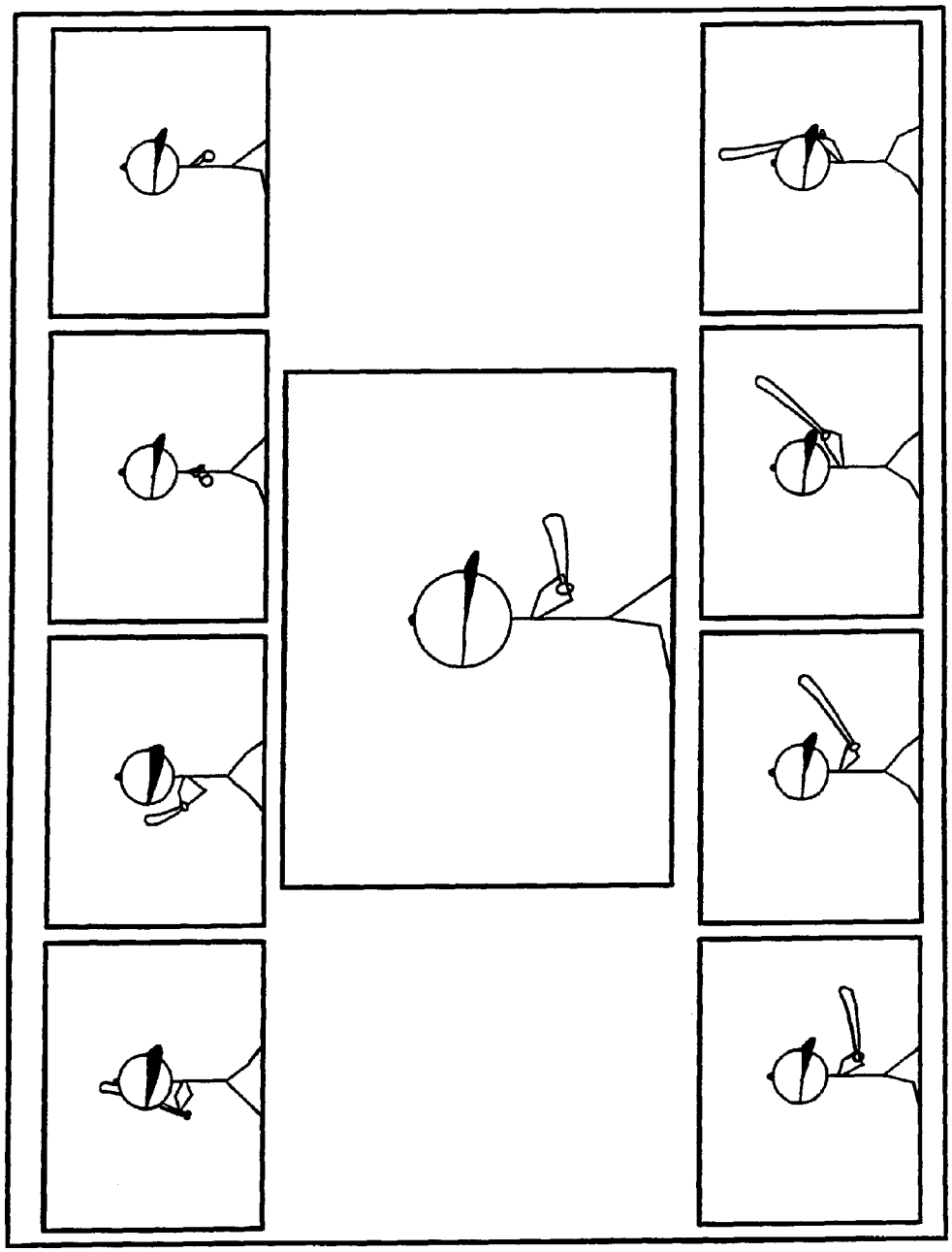
FIG. 5 is a diagram of images from a generated set of assembled image data.

FIG. 5 is a diagram of images from a generated set of assembled image data. In particular, FIG. 5 shows the set of assembled image data generated when the image data indicated by C in FIG. 4 is selected in the operation of the SET key.

As is clear from FIG. 5, the image indicated by C in FIG. 4 is largely displayed in the center, so as to be the main image.

As a result, the image picked up at the perfect moment can be acquired. The images before and after (including only images before and only images after) the image picked up at the perfect moment are also clearly recognizable.

(11) According to the first embodiment and the variation examples (1) to (10), recording of the image data is described. However, the same can be applied to printing. In other words, the same can be applied when the recorded image data and the generated set of assembled image data, described above, are printed. In this case, the image data can be recorded. However, the image data is not required to be recorded. As a result, the image picked up at the perfect moment can be printed.

(12) According to the first embodiment and the variation examples (1) to (11), when the condition that the shutter button be half-depressed is met, the pieces of picked-up image data are stored. However, the pieces of picked-up image data can be stored under other conditions.

Other conditions are, for example, when imaging mode is selected by the user operating the mode switching key, when image recognition is used to judge whether a subject's face is imaged or whether a front of a face is imaged during a through-image display and the face or the front of the face is judged to be imaged, when the subject appears within an AF area, when a change occurs in the image within the AF area, when a difference between the currently picked-up image data and the previously picked-up image data increases (when the subject enters the angle of view), and when an instruction is given to store the image data. The other conditions also include when a predetermined sound is recognized through a microphone by sound recognition, when a sound louder than a predetermined level is recognized through the microphone, and when the user gives a predetermined instruction.

It is only required that the image data be stored under the predetermined conditions.

(13) According to the first embodiment and the variation examples (1) to (12), the CPU 10 judges whether the user fully depresses the shutter button. However, whether another condition is met can be judged instead of whether the shutter button is fully depressed. When the CPU 10 judges that the other condition is met, the identifying information can be associated with the image data picked up at the time the other condition is met and recorded. Furthermore, a moving image can be picked up for a predetermined amount of time upon the other condition being met.

Other conditions are, for example, when face recognition judges that an expression on the subject's face has changed, when the subject appears within an AF area, when a change occurs in the image within the AF area, and when a difference between the currently picked-up image data and the previously picked-up image data is detected and the area in which the difference is present has moved to the center. The other conditions also include when a predetermined sound is recognized through a microphone by sound recognition, when a sound louder than a predetermined level is recognized through the microphone, and when the user gives a predetermined instruction.

It is only required that the identifying information be associated and recorded with the image data picked up when the predetermined condition is met.

(14) According to the first embodiment and the variation examples (1) to (13), when the user fully depresses the shutter button, a moving image is automatically picked up for a predetermined amount of time at Step S8 in FIG. 2. However, the moving image can be picked up until the user releases the full-depression of the shutter button. In other words, the consecutive image is completed when the user releases the full-depression of the shutter button. The CPU 10 then proceeds to Step S9.

Rather than the moving-image pickup being completed by the user releasing the full-depression of the shutter button, the moving-image pickup can be completed when another condition is met.

The other conditions are, for example, when the subject's face has stopped being imaged, when the angle to which the front of the subject's face is facing significantly changes from a state in which the front of the subject's face is imaged (such as when the back of the subject's head is being imaged), when the subject disappears from the AF area, when the difference between the currently picked-up image data and the previously picked-up image data no longer exists or decrease (when the subject disappears), and when the user gives a predetermined instruction.

(15) According to the first embodiment and the variation examples (1) to (14), the lag in the timings at which the image data picked up when the user fully depresses the shutter button is picked up and the recorded image data is picked up is recorded as the lagged-timing. However, a number of lagged frames can be stored as the lagged-timing.

For example, when the image data picked up when the user fully depresses the shutter button is B and the recorded image data is C, the image data C is picked up two frames before the image data B. The difference in the number of frames can be stored as the lagged-timing, such as "two frames".

When the number of frames is recorded as the lagged-timing, the frame rate at which the consecutive imaging is performed is required to be constant at each time. This is because when the frame rate changes, the time lag differs even when the number of frames is the same.

The lagged-timing is relative information indicating the amount of lag in the timing, with the timing at which the user fully depresses the shutter button as a reference point.

However, the lagged-timing can indicate a lag between the reference timing and the timing at which the recorded image data is picked up, with the timing at which the first piece of image data is picked up by the consecutive imaging process or the timing at which the last piece of image data is picked up by the consecutive imaging process as the reference point.

(16) According to the first embodiment and the variation examples (1) to (15), the consecutive imaging process is performed. However, a moving-image pickup process can be performed instead of the consecutive imaging process. In this case, imaging control (such as frame rate) of the moving-image pickup process performed before the user half-depresses the shutter button and the moving-image pickup process performed after the user half-depresses the shutter button can differ.

(17) Finally, in the first embodiment described above, the imaging apparatus of the invention is applied to the digital camera 1. However, the imaging apparatus can be applied to a portable phone including a camera function, a personal digital assistant (PDA) including a camera function, a personal computer including a camera function, an integrated chip (IC) recorder including a camera function, a digital video camera, and the like. The imaging apparatus can be applied to any device that can image a subject.

B. Second Embodiment

Next, a second embodiment of the invention will be described.

B-1. Configuration of the Digital Camera

The overall electrical schematic of the digital camera according to the second embodiment is the same as that shown in FIG. 1. A drawing thereof is omitted.

However, according to the second embodiment, the CPU 10 includes a function for performing imaging control of the CCD 5, a process for storing the picked up image data in the DRAM 13, a process for recording the image data to the flash memory 14, and a process for displaying the image data. The CPU 10 is a one-chip microcomputer controlling each section of the digital camera 1. The CPU 10 includes a clock circuit and also functions as a timer.

In particular, the CPU 10 also has a function for consecutively imaging a subject (consecutive imaging controlling section), a function for acquiring a plurality of pieces of consecutively picked-up image data based on a timing arbitrarily indicated by the user (image acquiring section), a function for acquiring an imaging situation (acquiring section), a function for acquired lagged-timing information based on the acquired imaging situation (lagged-timing information acquiring section), and a function for performing a predetermined process using the acquiring lagged-timing information and the acquired image data (controlling section).

B-2. Operations of the Digital Camera

An operation performed by the digital camera 1 according to the second embodiment will be described with reference to the flowcharts in FIG. 6 and FIG. 7.

Figure 6:
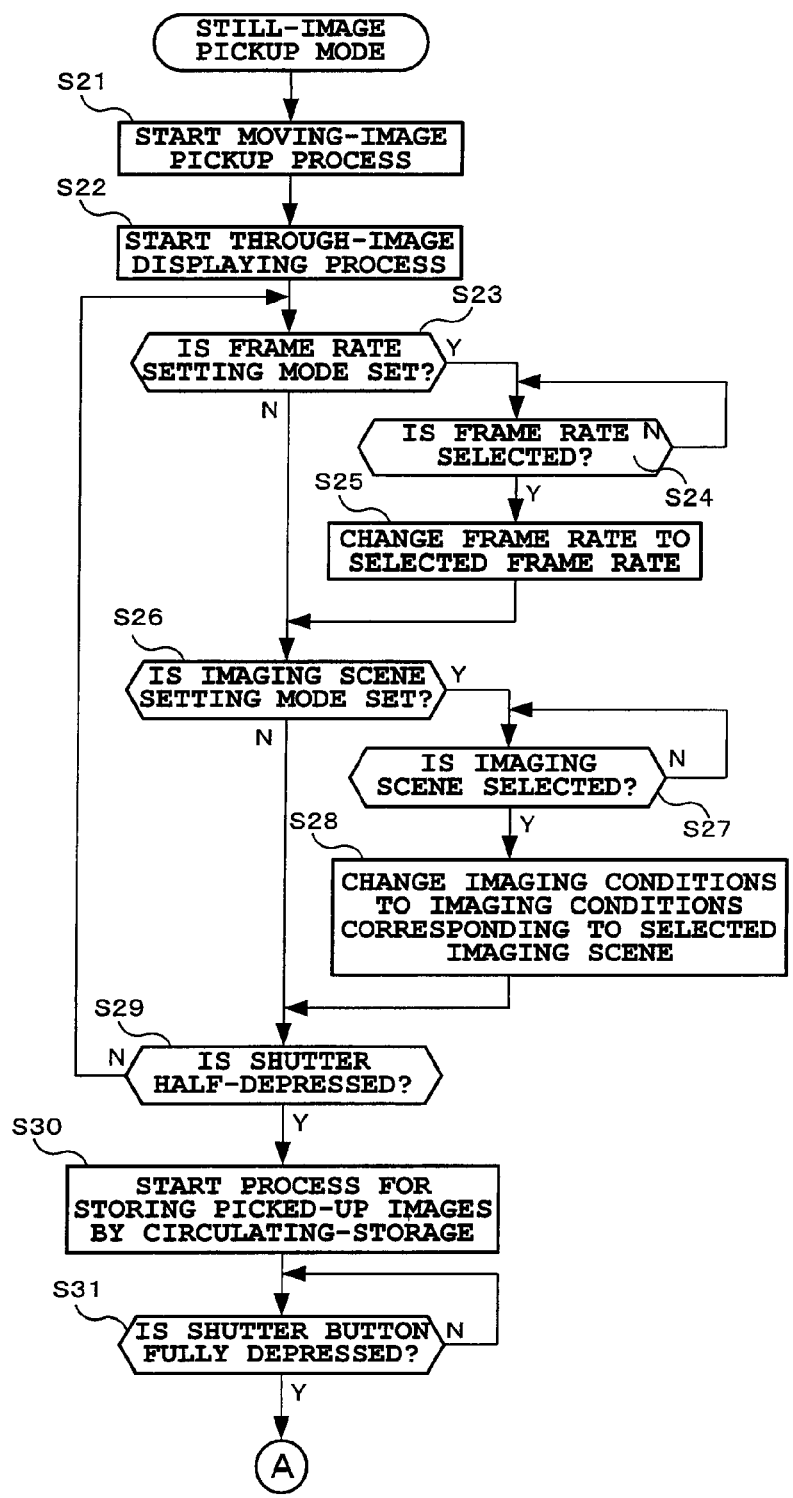
FIG. 6 is a flowchart of an operation performed by a digital camera according to a second embodiment.
Figure 7:
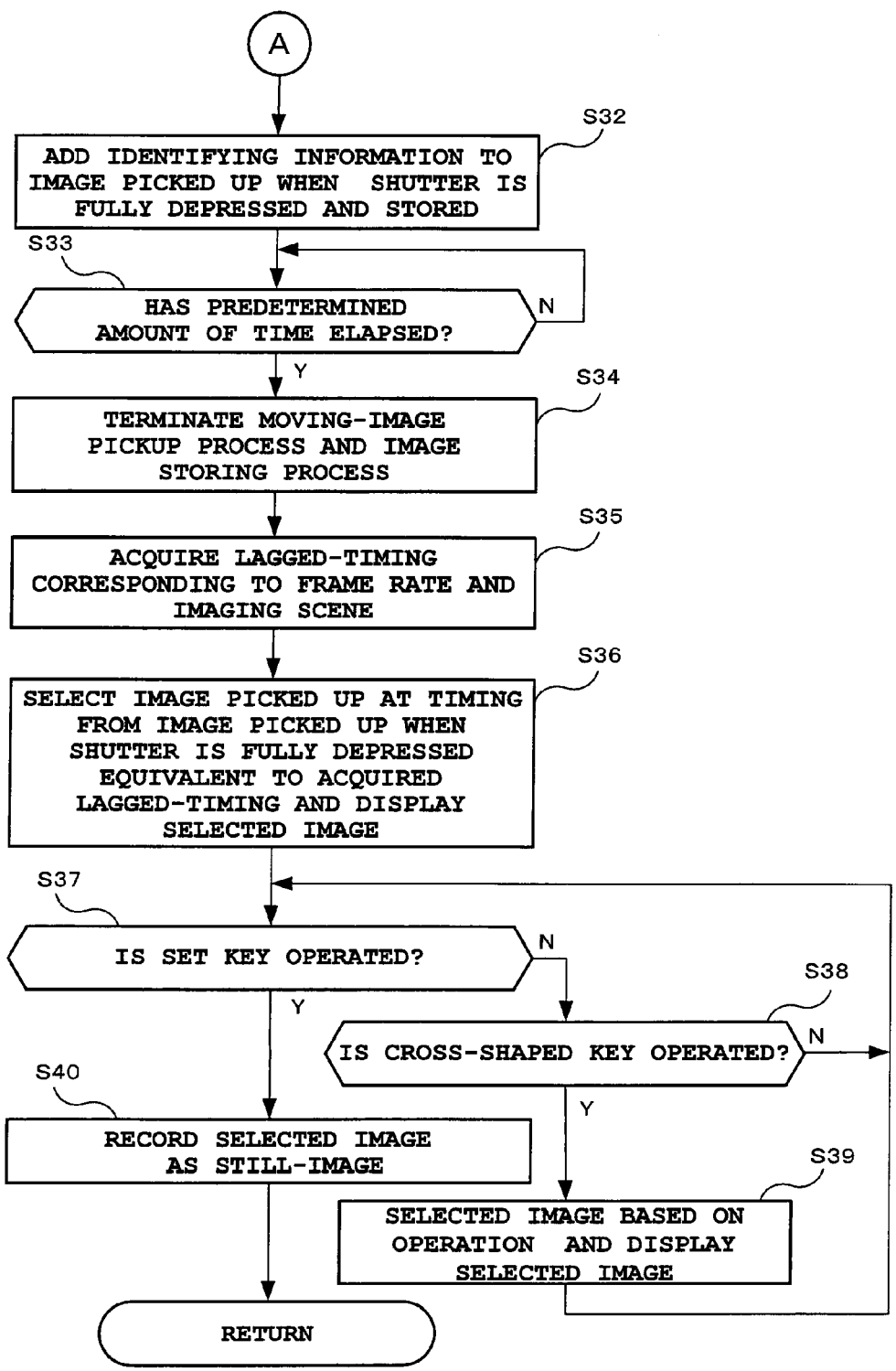
FIG. 7 is a flowchart of an operation performed by the digital camera according to the second embodiment.

In FIG. 6 and FIG. 7, when the user sets the digital camera 1 to the still-image pickup mode by operating the mode switching key in the key inputting section 11, at Step S21, the CPU 10 starts imaging at a predetermined frame rate (such as 30 frames per second) using the CCD 5.

Next, at Step S22, the CPU 10 performs the so-called through-image display. In the through-image display, the CCD 5 successively picks up images. The buffer memory (DRAM 13) stores the image data of the luminance and color difference signals successively generated by the image generating section 9. The image displaying section 15 displays the stored image data.

Next, at Step S23, the CPU 10 judges whether the user has set the digital camera 1 to frame rate (consecutive imaging speed) setting mode. The CPU 10 makes the judgment based on whether an operation signal corresponding to an operation of a frame rate setting key is sent from the key inputting section 11. Here, the user operates the frame rate setting key when the user wishes to set the current frame rate of a moving image to a frame rate adhering to the current state of the subject. As a result, the user can change the frame rate.

When the CPU 10 judges at Step S23 that the frame rate setting mode is set, at Step S24, the CPU 10 judges whether the user has selected an arbitrary frame rate.

At this time, when the CPU 10 judges that the frame rate setting mode is set, the CPU 10 displays a plurality of frame rates (such as frame rates of 15 frames per second, 30 frames per second, and 60 frames per second) in a list in the image displaying section 15. The user can select an arbitrary frame rate from among the listed plurality of frame rates by operating the cross-shaped key and the SET key. Here, the user selects a high frame rate when the subject moves at a high-speed. The user selects a low frame rate when the subject is still or moves slowly. Here, a subject swinging a bat, which is a relatively fast movement, is imaged. Therefore, the user selects "60 frames per second".

The frame rate selection made by the user will be briefly described. The user can pre-select an arbitrary frame rate by operating the cross-shaped key. When the user is satisfied with the pre-selected frame rate, the user operates the SET key to select the pre-selected frame rate. At this time, the pre-selected frame rate is distinctly displayed (in other words, displayed such as to be distinguishable) from the other frame rates.

When the plurality of frame rates are listed and displayed, the CPU 10 can pre-select the frame rate at which the current moving image is picked up. Alternatively, the CPU 10 can remove the frame rate at which the current moving image is picked up from the listed and displayed frame rates.

When the CPU 10 judges at Step S24 that the user has not selected the frame rate, the CPU 10 remains at Step S24 until the CPU 10 judges that the selection has been made. When the CPU 10 judges that the user has selected the frame rate, the CPU 10 proceeds to Step S25. The CPU 10 changes the frame rate of moving-image pickup to the selected frame rate, stores the changed frame rate in a rate storing area of the buffer memory, and then proceeds to Step S26. As a result, after the frame rate is changed, the moving image is picked up at the changed frame rate. Only the current frame rate of the moving image is stored in the rate storing area. When the frame rate is changed, the frame rate after being changed is stored.

At the same time, when the CPU 10 judges at Step S23 that the frame rate setting mode is not set, the CPU 10 proceeds directly to Step S26.

At Step S26, the CPU 10 judges whether the user has set the digital camera 1 to imaging scene setting mode. The CPU 10 makes the judgment based on whether an operation signal corresponding to an operation of an imaging scene setting key is sent from the key inputting section 11. Here, when the user wishes to image the subject under imaging conditions of an imaging scene optimal for the current state of the subject, the user can change the imaging conditions by operating the imaging scene setting mode.

When the CPU 10 judges at Step S26 that the imaging scene setting mode is set, the CPU 10 proceeds to Step S27. The CPU 10 judges whether the user has selected an arbitrary imaging scene.

At this time, when the CPU 10 judges that the imaging scene setting mode is set, the CPU 10 lists the names of a plurality of kinds of imaging scenes stored in the memory 12 and displays the list in the image displaying section 15. The user can select an arbitrary imaging scene from the listed names of a plurality of kinds of imaging scenes by operating the cross-shaped key and the SET key. An imaging condition table is recorded in the memory 12 in advance. The imaging condition table records the names of the plurality of kinds of imaging scenes and imaging conditions (such as aperture, shutter speed, and sensitivity) corresponding with each imaging scene. Here, the user selects the imaging scene optimal for the current state of the subject. The imaging scenes include a plurality of imaging scenes, such as "imaging people", "imaging scenery", "imaging children", and "imaging a sporting event". The imaging conditions corresponding with each imaging scene are recorded. Here, a subject swinging a bat is being imaged. Therefore, "sporting event" is selected.

The imaging scene selection made by the user will be described in detail. The user can pre-select an arbitrary imaging scene by operating the cross-shaped key. When the user is satisfied with the pre-selected imaging scene, the user operates the SET key to select the pre-selected imaging scene. At this time, the pre-selected imaging scene is distinctly displayed from the other imaging scenes.

Rather than the imaging scenes being listed and displayed, the imaging scenes can be individually displayed by each image scene. In this case, the user advances the frames of the individually displayed imaging scenes by operating the cross-shaped key and selects the individually displayed imaging scene by operating the SET key.

When the CPU 10 judges at Step S27 that the user has not selected the imaging scene, the CPU 10 remains at Step S27 until the imaging scene is selected. Then, when the CPU 10 judges that the user has selected the imaging scene, the CPU 10 proceeds to Step S28. At Step S28, the CPU 10 changes the current imaging conditions of the moving image to the imaging conditions corresponding to the selected imaging scene, stores information (such as the name) on the selected imaging scene in an imaging scene storing area of the buffer memory and then proceeds to Step S29. As a result, after the imaging scene is selected, the moving image is picked up under the imaging conditions that have been changed (the imaging conditions corresponding to the selected imaging scene). Imaging can be performed under imaging conditions suitable for the current imaging situation. The name of the imaging scene stored in the imaging scene storing area is the name of the most recently selected imaging scene. When the imaging scene is selected again, only the name of the selected imaging scene is stored.

At Step S29, the CPU 10 judges whether the user has half-depressed the shutter button. The CPU 10 makes the judgment based on whether an operation signal corresponding to a half-depression operation of the shutter button is sent from the key inputting section 11.

At this time, the user half-depresses the shutter button when the user expects that a perfect moment will soon arrive.

When the CPU 10 judges at Step S29 that the shutter button is not half-depressed, the CPU 10 returns to Step S23 and repeats the above-described operation.

As a result, the frame rate and imaging scene selections can be changed until the user half-depresses the shutter button.

When the user selects the frame rate and the imaging scene, imaging is performed at the selected frame rate under the imaging conditions corresponding to the selected imaging scene. However, imaging can be performed at the frame rate under the imaging conditions corresponding to the imaging scene selected by the user for only the imaging performed during the imaging process after the user half-depresses the shutter button, as well. In other words, until the user half-depresses the shutter button, the imaging process is not affected by the selected frame rate and the imaging conditions corresponding to the selected imaging scene, even when the user selects the frame rate and the imaging scene.

At the same time, when the CPU 10 judges at Step S29 that the shutter button is half-depressed, the CPU 10 proceeds to Step S30. The CPU 10 starts a process for successively storing pieces of frame image data, picked up after the user half-depresses the shutter button, in the buffer memory by using circulating-storage. In circulating-storage, the pieces of picked-up frame image data are successively stored and accumulated until the buffer memory runs out of free space. When the buffer memory runs out of free space, a new piece of picked-up frame image data is written over the oldest piece of frame image data among the plurality of pieces of frame image data stored in the buffer memory. As a result, the pieces of frame image data from that picked up most recently to that picked up a certain amount of time earlier are stored.

Figure 8A:
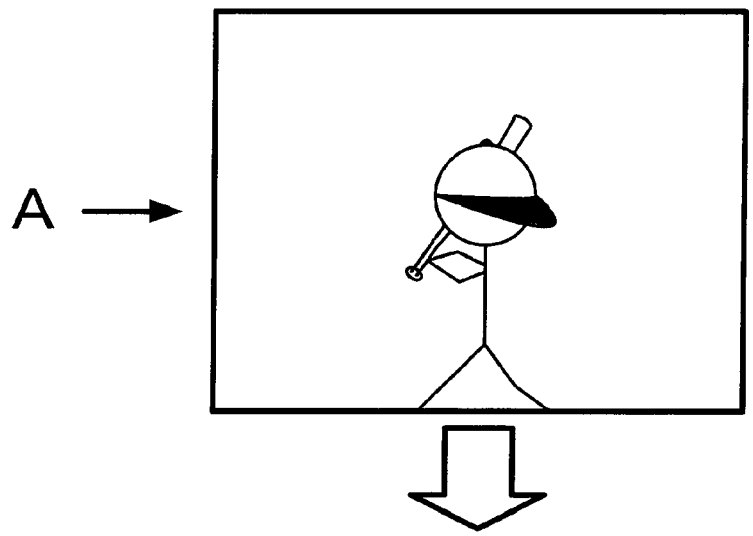
FIG. 8A is a diagram of an image displayed in the image displaying section at a certain timing.
Figure 8B:
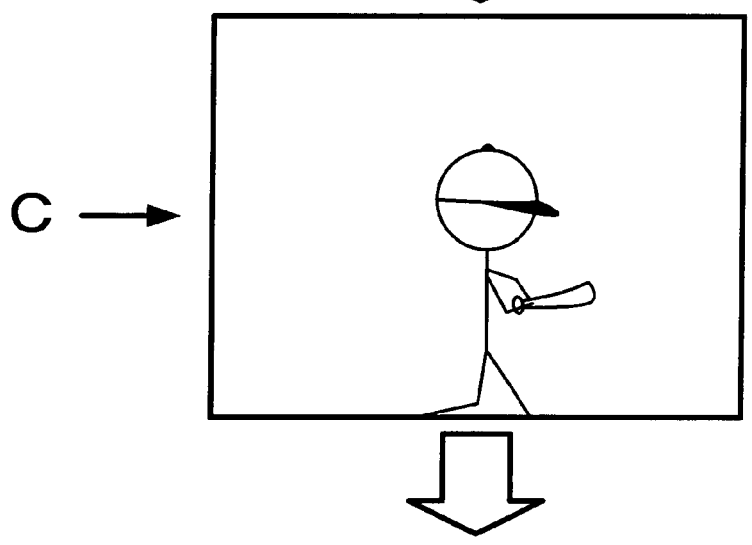
FIG. 8B is a diagram of an image displayed in the image displaying section at a certain timing.
Figure 8C:
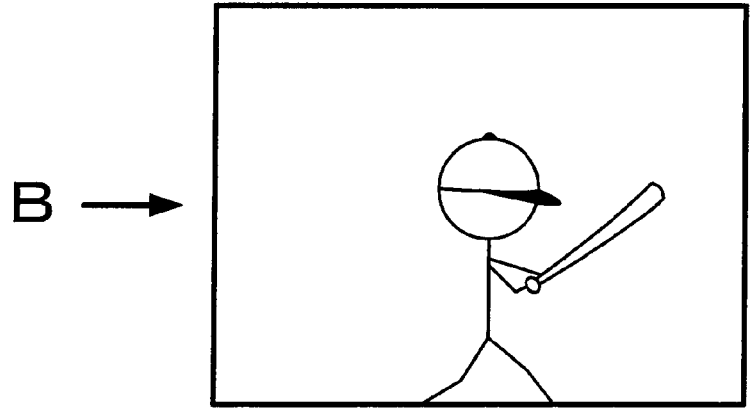
FIG. 8C is a diagram of an image displayed in the image displaying section at a certain timing.

FIG. 8A to FIG. 8C are each diagrams of an image displayed in the image displaying section 15 at a certain timing. The timings of the images indicate a passage of time, such as from A to C to B.

The image indicated by A in FIG. 8A is that picked up and displayed first, after the user half-depresses the shutter button.

Next, at Step S31, the CPU 10 judges whether the user has fully depressed the shutter button. The CPU 10 makes the judgment based on whether an operation signal corresponding to a full-depression operation of the shutter button is sent from the key inputting section 11.

At this time, the user fully depresses the shutter button upon judging that the perfect moment has arrived.

At Step S31, when the CPU 10 judges that the shutter button is not fully depressed, the CPU 10 remains at Step S31 until the shutter button is fully depressed. When the CPU 10 judges that the shutter button is fully depressed, the CPU 10 proceeds to Step S32 in FIG. 7. The CPU 10 adds the identifying information to the frame image data picked up when the shutter button is fully depressed and stores the image data. The identifying information allows the image indicated as that picked up at the perfect moment to be identified. The identifying information can be added to the frame image data displayed in the image displaying section 15 when the shutter button is fully depressed.

Next, at Step S33, the CPU 10 judges whether a predetermined amount of time (such as two seconds) has elapsed since the user fully depressed the shutter button.

When the CPU 10 judges at Step S33 that the predetermined amount of time has not elapsed, the CPU 10 remains at Step S33 until the predetermined amount of time has elapsed. When the CPU 10 judges that the predetermined amount of time has elapsed, the CPU 10 proceeds to Step S34, and completes the moving-image pickup process and the circulating-storage process for the picked-up frame image data.

The moving image is picked up and stored for a predetermined amount of time because, based on the imaging situation, such as the state of the subject, the user may fully depress the shutter button after the perfect moment or the user may fully depress the shutter button before the perfect moment. Unless the moving image is picked up and stored after the shutter button is fully depressed, when the user fully depresses the shutter button before the perfect moment cannot be handled.

Because the frame image data is stored in the buffer memory by circulating-storage, when the length of the predetermined amount of time is long, all pieces of frame image data stored in the buffer memory are considered to be those picked up after the shutter button is fully depressed. Therefore, the length of the predetermined amount of time is required to be set such that at least a plurality of pieces of frame image data picked up before the shutter button is fully depressed are stored in the buffer memory. The predetermined amount of time is preferably set to an amount of time during which the number of pieces of frame image data picked before the shutter button is fully depressed and the number of pieces of frame image data picked up after the shutter button is fully depressed are roughly the same.

Next, at Step S35, the CPU 10 acquires the lagged-timing information corresponding to the frame rate at which the pieces of frame image data stored in the buffer memory are picked up (the frame rate stored in the rate storing area) and the name of the imaging scene corresponding to the imaging conditions under which the pieces of frame image data are picked up (the name of the imaging scene stored in the imaging scene storing area). The lagged-timing information is acquired from the lagged-timing table recorded in the memory 12.

FIG. 9A is a diagram explaining the lagged-timing table recorded in the memory 12.

It is clear from FIG. 9A that the lagged-timing information (time lag:ms) is recorded for each imaging scene and each frame rate.

The time lag is "+ . . . ms" and "− . . . ms" (not shown). The time lag being − indicates the lagged-timing when the user fully depresses the shutter button after the perfect moment. The time lag being + indicates the lagged-timing when the user fully depresses the shutter button before the perfect moment. The imaging scene field in FIG. 9A includes "none" to indicate the lagged-timing corresponding to each frame rate when the user has not selected the imaging scene.

In this way, the lagged-timing information corresponding to the imaging scene and the frame rate are recorded in the lagged-timing table. Therefore, the lagged-timing information based on the state of the subject and the imaging situation can be easily and quickly acquired.

For example, even when the user considers the image such as that indicated by C in FIG. 8B to be the perfect moment, the image picked up when the shutter button is actually fully depressed is an image such as that indicated by B in FIG. 8C. A time lag occurs. In other words, depending on the imaging situation, the timing at which the shutter button is actually fully depressed becomes later than the timing of the perfect moment. When the user predicts the perfect moment in advance and gives an instruction for imaging, the timing at which the shutter button is actually fully depressed is earlier than the perfect timing. A time lag occurs between the timing of the perfect moment and the timing of the imaging instruction. Therefore, the image picked up (displayed) when the shutter button is fully depressed is not the image of the perfect moment. Thus, to acquire the time lag between the perfect moment and when the shutter button is fully depressed in the imaging situation, the time lag (lagged-timing information) is acquired from the lagged-timing table based on the selected imaging scene and frame rate, or in other words, based on the imaging situation.

Next, at Step S36, among the pieces of frame image data stored in the buffer memory, from the frame image data to which the identifying information is added (the frame image data picked up when the shutter button is fully depressed or the frame image data displayed when the shutter button is fully depressed), the CPU 10 selects the frame image data picked up at a timing equivalent to the amount of lagged-timing in the acquired lagged-timing information. The CPU 10 selects the frame image data as the recommended image (image picked up at the perfect moment) and displays the selected frame image data in the image displaying section 15.

The recommended image selection will be described in detail. The CPU 10 calculates the number of lagged frames based on the current frame rate (the frame rate currently stored in the frame rate storing area) and the acquired lagged-timing, and selects the frame image data of a frame equivalent to the calculated number of lagged frames as a recommended image from the frame image data to which the identifying information is added. The frame rate is added because even when the time lag is the same, the number of lagged frames differs based on the frame rate (30 frames per second or 60 frames per second).

For example, when the acquired lagged-timing information is "−50 (ms)", the frame image data picked up at a timing 50 ms before the imaging timing of the frame image data to which the identifying information is added is selected as the recommended image, and the selected frame image data is displayed.

In other words, the number of lagged frames is calculated based on "−50 (ms)", which is the lagged-timing information, and the current frame rate. When the calculated number of lagged frames is, for example, "−3 frames", the frame image data picked up three frames before the frame image data to which the identifying information is added is selected.

On the other hand, when the acquired lagged-timing information is "+ . . . (ms)", the calculated number of lagged frames is "+ . . . frames". The frame image data selected as the recommended image is that picked up after the frame image data to which the identifying information is added.

Next, at Step S37, the CPU 10 judges whether the user has operated the SET key. The CPU 10 makes the judgment based on whether an operation signal corresponding to an operation of the SET key is sent from the key inputting section 11.

At this time, the user operates the SET key when the user wishes to record the selected and displayed frame image data as still-image data.

When the CPU 10 judges at Step S37 that the user has not operated the SET key, the CPU 10 proceeds to Step S38. The CPU 10 judges whether the user has operated the cross-shaped key. The CPU 10 makes the judgment based on whether an operation signal corresponding to an operation of the cross-shaped key is sent from the key inputting section 11.

When the CPU 10 judges at Step S38 that the user has operated the cross-shaped key, the CPU 10 proceeds to Step S39, and newly selects frame image data based on the operation. The image displaying section 15 displays the selected image data, and the CPU 10 proceeds to Step S37.

For example, when the user operates the "↓" key of the cross-shaped key, the CPU 10 newly selects and displays frame image data picked up after the selected and displayed frame image data. When the user operates the "↑" key of the cross-shaped key, the CPU 10 newly selects and displays image data picked up before the selected and displayed image data. As a result, the image picked up at the perfect moment can be found from among the pieces of frame image data stored through moving-image pickup. The user can also check the image that has been picked up.

At the same time, when the CPU 10 judges at Step S38 that the user has not operated the cross-shaped key, the CPU 10 returns directly to Step S37.

When the CPU 10 judges at Step S37 that the user has operated the SET key, the CPU 10 proceeds to Step S40. The CPU 10 selects the selected (displayed) frame image data as the frame image data picked up at the best timing (the perfect moment), and stores the selected frame image data in the flash memory 14 as the still-image data. In other words, the frame image data selected as the image picked up at the best timing can be recorded.

The frame image data displayed when the user has operated the SET key is selected as the image picked up at the best timing. Therefore, an erroneous selection of the image picked up at the best timing does not occur.

As described above, according to the second embodiment, the user selects the imaging scene and the frame rate based on the imaging situation. The CPU 10 acquires the lagged-timing information corresponding to the selected imaging scene and frame rate. Therefore, the time lag (the lagged-timing information) between the timing at which the instruction for imaging is actually given and the timing of the perfect moment can be acquired based on the imaging situation.

The frame image data set based on the timing at which the shutter button is fully depressed and the acquired lagged-timing information is displayed first as the recommended image. Therefore, the image considered to be that picked up at the timing (the perfect moment) at which the user wishes to perform imaging can be displayed first.

C. Third Embodiment

Next, a third embodiment will be described.

According to the second embodiment, the lagged-timing information is acquired from the lagged-timing table recorded in advance. However, according to the third embodiment, the CPU 10 learns the actual lagged-timing information of the user and updates the information in the lagged-timing table.

C-1. Configuration of the Digital Camera

According to the third embodiment as well, an imaging apparatus according to the embodiment is actualized by a digital camera having the same configuration as that shown in FIG. 1.

According to the third embodiment, a lagged-timing table such as that shown in FIG. 9B is recorded in place of the lagged-timing table in FIG. 9A.

C-2. Operations of the Digital Camera

Hereafter, operations performed by the digital camera 1 according to the third embodiment will be described with reference to the flowcharts in FIG. 10 and FIG. 11.

Figure 10:
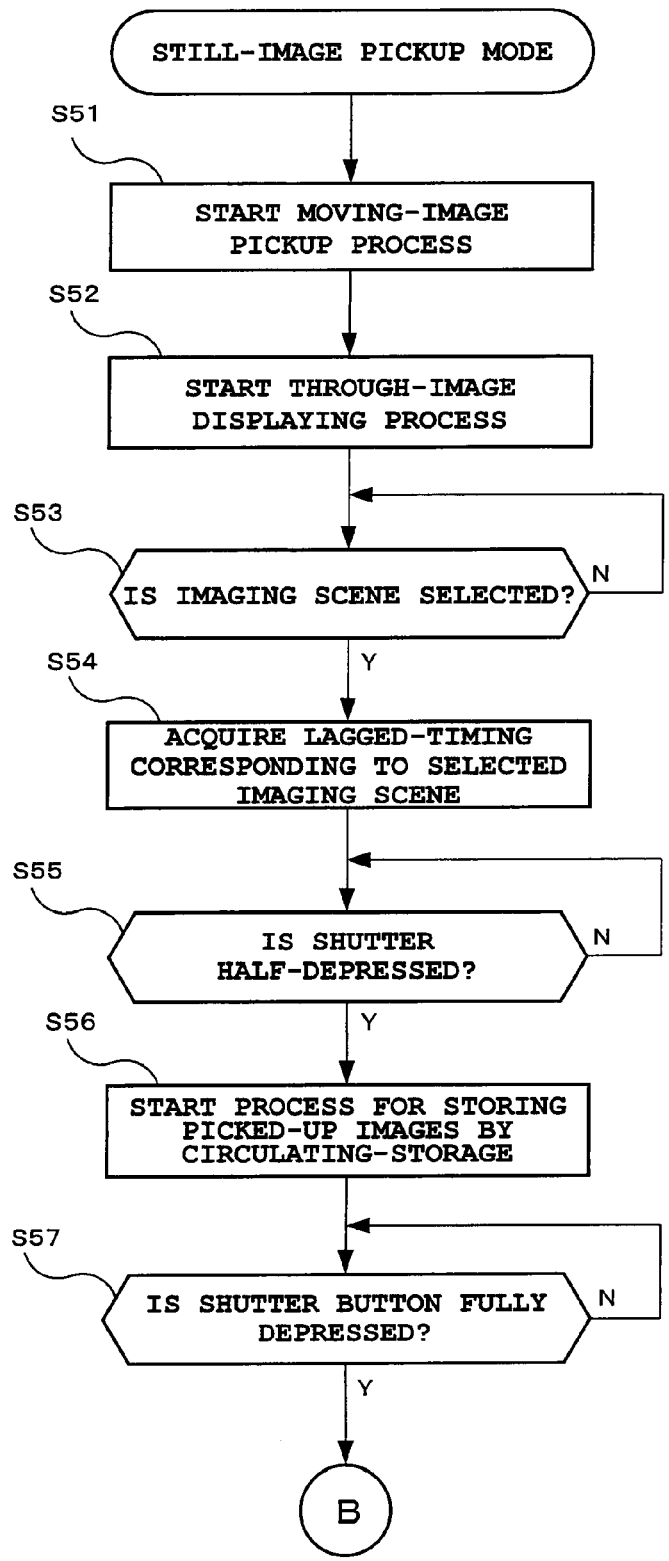
FIG. 10 is a flowchart of an operation performed by a digital camera according to a third embodiment.

When the user sets the digital camera 1 to the still-image pickup mode by operating the mode switching key in the key inputting section 11, at Step S51 in FIG. 10, the CPU 10 starts imaging at a predetermined frame rate (such as 30 frames per second) using the CCD 5.

Next, at Step S52, the CPU 10 performs the so-called through-image display. In the through-image display, the CCD 5 successively picks up images. The buffer memory (DRAM 13) stores the image data of the luminance and color difference signals successively generated by the image generating section 9. The image displaying section 15 displays the stored image data. At this time, the CPU 10 displays the names of the plurality of kinds of imaging scenes recorded in the memory 12.

Next, at Step S53, the CPU 10 judges whether the user has selected the imaging scene.

At this time, the user can select an arbitrary imaging scene from among the displayed names of the plurality of kinds of imaging scenes by operating the cross-shaped key and the SET key.

The imaging scenes include a plurality of imaging scenes, such as "imaging batter", "imaging pitcher", "imaging shot" and "imaging tennis serve". The names of the plurality of kinds of imaging scenes are arbitrarily given by the user. Instead of the user giving the imaging scenes arbitrary names, the imaging scenes can be given names decided in advance, such as "learning 1", "learning 2", and "learning 3".

When the CPU 10 judges at Step S53 that the imaging scene is not selected, the CPU 10 remains at Step S53 until the user selects the imaging scene. When the CPU 10 judges that the imaging scene is selected, the CPU 10 proceeds to Step S54. The CPU 10 acquires the information on the selected imaging scene and acquires the lagged-timing information corresponding to the acquired imaging scene from the lagged-timing table. Here, a subject swinging a bat is imaged. Therefore, the "imaging batter" is selected.

FIG. 9B is a diagram explaining the lagged-timing table recorded in the memory 12 according to the third embodiment.

It is clear from FIG. 9B that the lagged-timing information (time lag:ms) for each imaging scene is recorded. At this time, the number of updates (not shown) for each imaging scene is also stored with the lagged-timing information.

The lagged-timing information recorded for each imaging scene is initially ±0 ms (when the number of updates is zero).

The lagged-timing information is updated based on the actually acquired lagged-timing information described hereafter.

Next, the CPU 10 proceeds to Step S55, and judges whether the user has half-depressed the shutter button. At this time, the user half-depresses the shutter button when the user expects that a perfect moment will soon arrive.

When the CPU 10 judges at Step S55 that the shutter button is not half-depressed, the CPU 10 remains at Step S55 until the shutter button is half-depressed. When the CPU 10 judges that the shutter button is half-depressed, the CPU 10 proceeds to Step S56. The CPU 10 starts a process in which the pieces of frame image data picked up after the shutter button is half-depressed are successively stored in the buffer memory by circulating-storage.

At this time as well, the image first picked up after the shutter button is half-depressed is an image such as that indicated by A in FIG. 4.

Next, at Step S57, the CPU 10 judges whether the user has fully depressed the shutter button. The user fully depresses the shutter button upon judging that the perfect moment has arrived.

When the CPU 10 judges at Step 57 that the shutter button is not fully depressed, the CPU 10 remains at Step S57 until the shutter button is fully depressed. When the CPU 10 judges that the shutter button is fully depressed, the CPU 10 proceeds to Step S58 in FIG. 11. The CPU 10 adds identifying information to the frame image data picked up when the shutter button is fully depressed and stores the frame image data. The identifying information allows the frame image data picked up when the shutter button is fully depressed to be identified as the image indicated as the image picked up at the perfect moment. The identifying information can also be added to the frame image data displayed in the image displaying section 15 when the shutter button is fully depressed.

Next, at Step S59, the CPU 10 judges whether a predetermined amount of time has elapsed since the shutter button was fully depressed.

When the CPU 10 judges at Step S59 that the predetermined amount of time has not elapsed, the CPU 10 remains at Step S59 until the predetermined amount of time passes. When the CPU 10 judges that the predetermined amount of time has elapsed, the CPU 10 proceeds to Step S60, and completes the moving-image pickup process and the circulating-storage process of the pieces of picked-up frame image data.

The length of the predetermined amount of time is, as described according to the second embodiment, required to be set such that at least a plurality of pieces of frame image data picked up before the shutter button is fully depressed are stored in the buffer memory. The predetermined amount of time is preferably set to an amount of time during which the number of pieces of frame image data picked before the shutter button is fully depressed and the number of pieces of frame image data picked up after the shutter button is fully depressed are roughly the same.

Next, at Step S61, among the pieces of frame image data stored in the buffer memory, from the frame image data to which the identifying information is added, the CPU 10 selects the frame image data picked up at a timing equivalent the amount of lagged-timing in the lagged-timing information acquired at Step S54. The image displaying section 15 displays the selected frame image data.

For example, even when the user considers the image such as that indicated by C in FIG. 8B to be that picked up at the perfect moment, the image that is actually picked up when the user fully depressed the shutter button is an image such as that indicated by B in FIG. 8C. Thus, a time lag occurs. In other words, depending on the imaging situation, the timing at which the user actually fully depresses the shutter button is later than the timing of the perfect moment, and when the user predicts the perfect moment in advance and gives an instruction for imaging, the timing at which the shutter button is actually fully depressed is earlier than the perfect timing. A time lag occurs between the timing of the perfect moment and the timing of the imaging instruction. Therefore, the image picked up (displayed) when the shutter button is fully depressed is not the image of the perfect moment. Thus, the CPU 10 selects and displays the recommended image thought to be picked up at the perfect moment taking into consideration the lagged-timing information based on the acquired selected imaging scene (based on the imaging situation).

Figure 12:
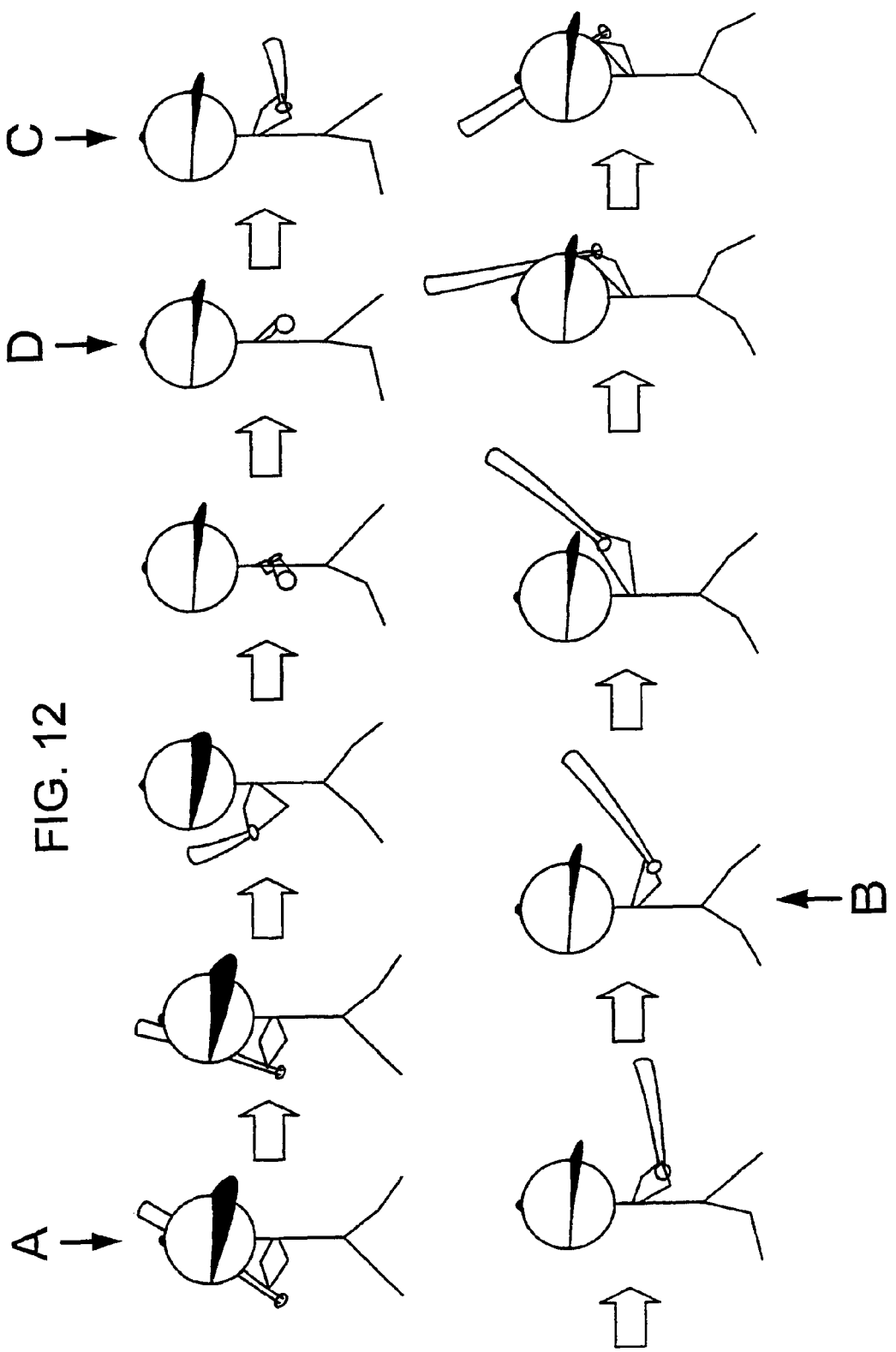
FIG. 12 is a diagram of images from each piece of image data stored in the buffer memory.

Here, FIG. 12 is a diagram of images from each piece of frame image data stored in the buffer memory.

It is clear from FIG. 12 that a person swinging a bat is being successively imaged.

The image indicated by C in FIG. 12 is the frame image data picked up when the user judges that the perfect moment has arrived. The image indicated by B or D in FIG. 12 is the frame image data picked up (or displayed) when the shutter button is actually fully depressed. A, B, and C in FIG. 12 and A, B, and C in FIG. 8A to FIG. 8C are respectively picked up at the same timing.

The image indicated by B in FIG. 12 is the frame image data picked up (or displayed) when the user fully depresses the shutter button after the perfect moment. The image indicated by D in FIG. 12 is the frame image data picked up (or displayed) when the user fully depresses the shutter button before the perfect moment.

When the user fully depresses the shutter button at the timing indicated by B in FIG. 12, for example, when "±0 (ms)" is stored in the lagged-timing information storing area as the lagged-timing information, the CPU 10 selects the frame image data picked up when the shutter button is actually fully depressed (or displayed) (the frame image data to which the identifying information is added), namely the frame image data indicated by B in FIG. 12, as the recommended image. The image displaying section 15 displays the selected frame image data. When information other than "±0 (ms)" is stored as the lagged-timing information, such as "−30 (ms)", the CPU 10 selects the frame image data picked up 30 (ms) earlier than the timing at which the frame image data indicated by B in FIG. 12 is picked up as the recommended image. The image displaying section 15 displays the selected image. The recommended image selected is the same as that according to the first embodiment described above.

Figure 11:
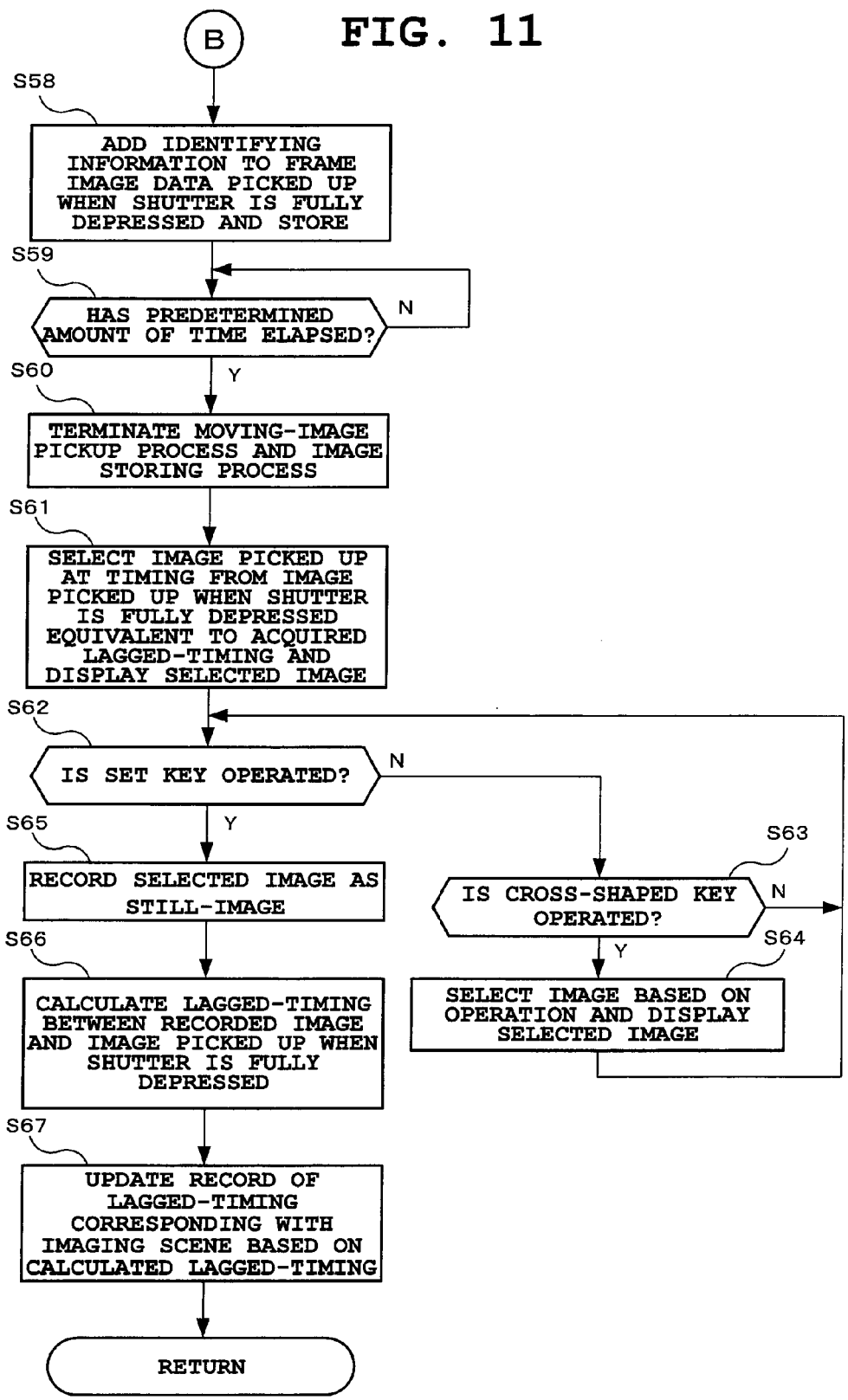
FIG. 11 is a flowchart of an operation performed by the digital camera according to the third embodiment.

In continuation of the explanation of the flowchart in FIG. 11, when the recommended image is displayed at Step S61, the CPU 10 proceeds to Step S62, and judges whether the user has operated the SET key.

At this time, the user operates the SET key when the user wishes to record the selected and displayed frame image data as still-image data, or in other words, when the user considers the frame image data to be an image picked up at the best timing.

When the CPU 10 judges at Step S62 that the user has not operated the SET key, the CPU 10 proceeds to Step S63, and judges whether the user has operated the cross-shaped key.

When the CPU 10 judges at Step S63 that the user has operated the cross-shaped key, the CPU 10 proceeds to Step S64, and newly selects frame image data based on the operation. The image displaying section 15 displays the selected image data and then the CPU 10 returns to Step S62. As a result, the image picked up at the perfect moment can be found from among the pieces of frame image data stored through moving-image pickup. The user can also check the image that has been picked up.

At the same time, when the CPU 10 judges at Step S63 that the user has not operated the cross-shaped key, the CPU 10 returns directly to Step S62.

Then, when the CPU 10 judges at Step S62 that the user has operated the SET key, the CPU 10 proceeds to Step S65. The CPU 10 selects the selected frame image data as the frame image data picked up at the best timing (the perfect moment), and records the selected frame image data in the flash memory 14 as still-image data. In other words, the image data selected as that picked up at the best timing can be recorded.

Next, at Step S66, the CPU 10 calculates the lagged-timing information indicating the time lag between the timings of the recorded (selected) frame image data and the frame image data to which the identifying information is added.

The calculation of the lagged-timing will be described in detail. First, the CPU 10 calculates the number of lagged frames between the recorded (selected) frame image data and the frame image data to which the identifying information is added. For example, when the frame image data to which the identifying information is added is the image indicated by B in FIG. 12 and the recorded (selected) frame image data is the image indicated by D in FIG. 12, the calculated number of lagged frames is "−3 frames". The CPU 10 then calculates the time lag (the lagged-timing information) based on the calculated number of lagged frames and the current frame rate (the frame rate currently stored in the frame rate storing area).

This is because, even when the numbers of lagged frames are the same, the time lags differ based on the frame rate.

Next, at Step S67, the CPU 10 updates storage of the lagged-timing information recorded in the lagged-timing table corresponding to the imaging scene selected at Step S53, based on the calculated lagged-timing information.

When updating the storage of the lagged-timing information, the CPU 10 calculates a mean value (or a weighted mean value) of the lagged-timing information, based on the lagged-timing information recorded in the lagged-timing table corresponding to the imaging scene selected at Step S53, the number of updates of the lagged-timing information, and the calculated lagged-timing information. The calculated lagged-timing information is recorded as the lagged-timing information corresponding to the imaging scene selected at Step S53. The number of updates is also updated.

For example, when the number of updates of the lagged-timing information corresponding to the imaging scene is 4 times, the recorded lagged-timing information is −30 (MS), and when the calculated lagged-timing information is −20 (ms), it is {−30 (ms)×4+(−20 (ms))}/5=−28 (ms) (when a simple average is determined).

The calculated lagged-timing information can be recorded as it is as the lagged-timing information corresponding with the imaging scene, without the mean value being calculated. In this case, the most recently calculated lagged-timing information is always recorded.

The lagged-timing information can be accumulated and stored every time the lagged-timing information is calculated at Step S66. In other words, each piece of past lagged-timing information is accumulated. In this case, at Step S54 in FIG. 10, a mean value of the pieces of accumulated and stored lagged-timing information corresponding to the selected imaging scene can be calculated, and the calculated lagged-timing information can be acquired.

As described above, according to the third embodiment, the time lag between the timing at which the frame image data selected and recorded by the user is picked up and the timing at which the shutter button is actually fully depressed is calculated for each imaging scene. The calculated time lag is calculated as the lagged-timing information and recorded. Therefore, the time lag (the lagged-timing information) between the timing at which the instruction for imaging is actually given and the timing of the perfect moment can be acquired based on the imaging situation.

The lagged-timing information is the mean value of the time lag calculated for each imaging scene in the past and the most recent time lag. Therefore, a lagged-timing table specifically for use by the user can be created.

The lagged-timing information corresponding to the imaging scene selected by the user is acquired from the lagged-timing table specifically for the user. Therefore, accuracy of the lagged-timing information can be enhanced and the first image to be displayed based on the acquired lagged-timing information is most likely the image picked up at the timing at which the user wishes to perform imaging (the perfect moment).

D. Fourth Embodiment

Next, a fourth embodiment will be described.

According to the second embodiment, the lagged-timing information is acquired from the lagged-timing table based on the imaging scene and the frame rate selected by the user. However, according to the fourth embodiment, an amount of movement by the subject is detected from the picked up frame image data, and then lagged-timing information based on the detected amount of movement is acquired from the lagged-timing table.

D-1. Configuration of the Digital Camera

According to the fourth embodiment as well, an imaging apparatus according to the embodiment is actualized by a digital camera having the same configuration as that shown in FIG. 1. According to the fourth embodiment, a lagged-timing table such as that shown in FIG. 9C is recorded in place of the lagged-timing table in FIG. 9A.

D-2. Operations of the Digital Camera

Hereafter, operations performed by the digital camera 1 according to the fourth embodiment will be described with reference to the flowchart in FIG. 13.

When the user sets the digital camera 1 to the still-image pickup mode by operating the mode switching key in the key inputting section 11, at Step S101, the CPU 10 starts imaging at a predetermined frame rate (such as 30 frames per second) using the CCD 5.

Next, at Step S102, the CPU 10 performs the so-called through-image display. In the through-image display, the CCD 5 successively picks up images. The buffer memory stores the frame image data of the luminance and color difference signals successively generated by the image generating section 9. The image displaying section 15 displays the stored frame image data. At this time, a box called a notable image designating box is displayed in a predetermined position (such as the center position) on the through-image display.

Next, at Step S103, the CPU 10 judges whether the user has half-depressed the shutter button. At this time, the user half-depresses the shutter button when the user expects that a perfect moment will soon arrive. The user also half-depresses the shutter button when the subject that the user truly wishes to image (main subject) overlaps with the notable image designating box. As described hereafter, when the user half-depresses the shutter button, the positions of the subject in which the subject overlaps with the notable image designating box when the shutter button is half-depressed are successively detected. Therefore, the user is required to align the main subject with the notable image designating box by changing the position and the direction of the digital camera 1.

When the CPU 10 judges at Step S103 that the shutter button is not half-depressed, the CPU 10 remains at Step S103 until the shutter button is half-depressed. When the CPU 10 judges that the shutter button is half-depressed, the CPU 10 proceeds to Step S104. The CPU starts a process in which the pieces of frame image data picked up after the shutter button is half-depressed are successively stored in the buffer memory by circulating-storage.

Next, at Step S105, the CPU 10 detects the position of the subject based on the pieces of successively picked-up frame image data. In other words, the CPU 10 detects the position of the main subject within the picked-up frame image data for each piece of successively picked-up frame image data. The detected position of the main subject is stored in the buffer memory.

The detection method for detecting the subject position can be as follows. The CPU 10 can recognize the main subject overlapping with the notable image designating box when the shutter button is half-depressed using image recognition, and can then detect where the main subject is positioned within the pieces of successively picked-up frame image data. A block matching method and the like can also be used to detect the position of the main subject. The notable image designating box can be displayed in the detected subject position. As a result, the notable image designating box tracks the main subject. The user can judge whether the position of the main subject is being accurately detected by viewing the notable image designating box.

Next, at Step S106, the CPU 10 judges whether the user has fully depressed the shutter button.

When the CPU 10 judges at Step S106 that the shutter button is not fully depressed, the CPU 10 remains at Step S106 until the shutter button is fully depressed. When the CPU 10 judges that the shutter button is fully depressed, the CPU 10 proceeds to Step S107. The CPU 10 adds identifying information to the frame image data picked up when the shutter button is fully depressed and stores the frame image data. The identifying information allows the frame image data picked up when the shutter button is fully depressed to be identified as the image indicated as the image picked up at the perfect moment. The identifying information can also be added to the frame image data displayed in the image displaying section 15 when the shutter button is fully depressed.

Next, at Step S108, the CPU 10 judges whether a predetermined amount of time has elapsed since the shutter button was fully depressed.

When the CPU 10 judges at Step S108 that the predetermined amount of time has not elapsed, the CPU 10 remains at Step S108 until the predetermined amount of time passes. When the CPU 10 judges that the predetermined amount of time has elapsed, the CPU 10 proceeds to Step S109, and completes the moving-image pickup process, the circulating-storage process of the pieces of picked-up frame image data, and the subject position detecting process.

The length of the predetermined amount of time is, as described according to the first embodiment, required to be set such that at least a plurality of pieces of frame image data picked up before the shutter button is fully depressed are stored in the buffer memory. The predetermined amount of time is preferably set to an amount of time during which the number of pieces of frame image data picked before the shutter button is fully depressed and the number of pieces of frame image data picked up after the shutter button is fully depressed are roughly the same.

Next, at Step S110, the CPU 10 calculates the amount of movement of the main subject based on the position of the main subject within a plurality of pieces of frame image data picked up before and after the shutter button is fully depressed, detected by the detecting process at Step S105.

The plurality of pieces of frame image data picked up before and after the shutter button is fully depressed refers to the plurality of pieces of frame image data from the piece of frame image data picked up a predetermined number of frames (such as 10 frames) before the full-depression of the shutter button to the piece of frame image data picked up a predetermined number of frames (such as 10 frames) after the full-depression of the shutter button. The CPU 10 calculates the amount of movement by the subject (amount of movement per unit of time) based on the plurality of pieces of frame image data and acquires the calculated amount of movement.

The calculation of the amount of movement by the subject based on the plurality of pieces of frame image data can be as follows. For example, the amount of movement by the main subject based on the positions of the main subject in two pieces of consecutive frame image data, among the plurality of pieces of frame image data, can each be calculated. The amount of movement by the subject can be a mean value of the calculated amounts of movement. Alternatively, the amount of movement by the subject can be a mean value weighted with the amount of movement of the main subject from immediately before to immediately after the shutter button is fully depressed.

The amount of movement can also be calculated based on two pieces of frame image data, the piece of frame image data that is picked up a predetermined number of frames before the full-depression of the shutter button and the piece of frame image data that is picked up a predetermined number of frames after the full-depression of the shutter button.

Next, at Step S111, the CPU 10 acquires the lagged-timing information corresponding with the calculated and acquired amount of movement from the lagged-timing table.

As shown in FIG. 8C, lagged-timing information based on the amount of movement is recorded in the lagged-timing table. Here, the amount of movement is divided into three levels (small, medium, and large), and the lagged-timing information is recorded for each level. However, the amount of movement can be divided into two levels or four levels. It is only required that the amount of movement be divided into a plurality of levels and the lagged-timing information be recorded for each level.

Next, at Step S112, among the pieces of frame image data stored in the buffer memory, from the frame image data to which the identifying information is added, the CPU 10 selects the frame image data picked up at the timing equivalent to the amount of lagged-timing in the acquired lagged-timing information, as the recommended image. The image displaying section 15 displays the selected frame image data.

Next, at Step S113, the CPU 10 judges whether the user has operated the SET key.

At this time, the user operates the SET key when the user wishes to record the selected and displayed frame image data as still-image data.

When the CPU 10 judges at Step S113 that the SET key is not operated, the CPU 10 proceeds to Step S114, and judges whether the user has operated the cross-shaped key.

When the CPU 10 judges at Step S114 that the cross-shaped key is operated, the CPU 10 proceeds to Step S115, and newly selects the frame image data based on the operation. The image displaying section 15 displays the selected frame image data, and then CPU 10 returns to Step S113. As a result, the image picked up at the perfect moment can be found from among the pieces of frame image data stored through moving-image pickup. The user can also check the image that has been picked up.

At the same time, when the CPU 10 judges at Step S114 that the user has not operated the cross-shaped key, the CPU 10 returns directly to Step S113.

When the CPU 10 judges at Step S113 that the user has operated the SET key, the CPU 10 proceeds to Step S116. The CPU 10 selects the selected (displayed) frame image data as the frame image data picked up at the best timing (the perfect moment), and records the selected frame image data in the flash memory 14 as the still-image data.

As described above, according to the fourth embodiment, the CPU 10 detects the amount of movement of the subject and acquires the detected amount of movement. The CPU 10 then acquires the lagged-timing information corresponding to the acquired amount of movement. Therefore, the CPU 10 can acquire the time lag (the lagged-timing information) between the timing at which the instruction for imaging is actually given and the timing of the perfect moment based on the imaging situation.

The frame image data set based on the timing at which the shutter button is fully depressed and the acquired lagged-timing information is displayed first as the recommended image. Therefore, the image considered to be that picked up at the timing (the perfect moment) at which the user wishes to perform imaging can be displayed first.

E. Variation Examples

The following variations of the second to fourth embodiments are possible.

(18) According to the above-described second embodiment, the lagged-timing information is acquired based on the imaging scene and the frame rate. However, the user can select either one of the imaging scene and the frame rate, and the lagged-timing information can be acquired based on the selected imaging situation. In this case, a lagged-timing table corresponding only to the imaging scene and a lagged-timing table corresponding only to the frame rate are provided.

(19) In the variation example (18), a demonstration moving image can be recorded for each imaging scene. The CPU 10 can have the user perform pseudo-imaging while the demonstration moving image is reproduced. The CPU 10 can calculate the time lag based on the result and record the calculated time lag as the lagged-timing information in the lagged-timing table. The recorded time lag can be recorded as a default value.

(20) According to the above-described second embodiment, the user manually selects the frame rate. However, the frame rate can be automatically selected. In this case, the CPU 10 judges the amount of movement of the subject. When the movement of the subject is fast (the amount of movement is large), a high frame rate is automatically selected. When the movement of the subject is slow (the amount of movement is small), a low frame rate is automatically selected.

(21) According to the second and fourth embodiments, when the SET key is operated at Step S37 in FIG. 7 and at Step S113 in FIG. 13, the currently displayed frame image data is simply recorded. However, as according to the third embodiment, the lagged-timing information indicating the time lag between the timings at which the recorded frame image data and the frame image data to which the identifying information is added are picked up can be calculated. The records in the lagged-timing table can be updated based on the calculated lagged-timing information.

According to the second embodiment, the record of the lagged-timing information corresponding with the selected imaging scene (Including when no imaging scene is selected)

and the selected frame rate is updated. According to the fourth embodiment, the record of the lagged-timing information corresponding to the calculated amount of movement by the subject is updated.

(22) According to the third embodiment, corresponding imaging conditions can be associated with each imaging scene and recorded. In this case, the imaging conditions can be associated by the user specifying the imaging conditions for each imaging scene and recorded.

The specification of the imaging conditions can be made by the user inputting parameters for each item (such as the aperture, the shutter speed, and the sensitivity) of the imaging conditions. Alternatively, when a piece of recorded image data is specified, the CPU 10 can extract the imaging conditions under which the imaging data is picked up that are associated with the imaging data and recorded. The imaging conditions can be associated with the imaging scene and recorded.

When the imaging scene is selected, the moving image is picked up under the imaging conditions associated with the imaging scene selected through specification from the user and recorded.

(23) According to the third and fourth embodiments, the lagged-timing table to which the lagged-timing information corresponding only to each imaging scene is recorded and the lagged-timing table to which the lagged-timing information corresponding only to the amount of movement by the subject is recorded are used. However, as according to the second embodiment, the lagged-timing table to which the lagged-timing information corresponding to the imaging scene and the frame rate is recorded can be used. Alternatively, a lagged-timing table to which lagged-timing information corresponding to the amount of movement by the subject and the imaging scene is recorded can be used.

In other words, it is only required that a lagged-timing table to which lagged-timing information corresponding to one or more conditions clarifying the imaging situation is recorded be used.

(24) According to the fourth embodiment, lagged-timing tables categorized into a table for humans, a table for animals, a table for objects, and the like can be provided. Whether the main subject is a human, an animal, or an object (such as an automobile) can be recognized by image recognition. The lagged-timing table based on the recognized category can be used.

(25) According to each embodiment, a plurality of lagged-timing tables can be recorded based on the age of the user or based on the user. A lagged-timing table corresponding with an age selected by the user or a user name can be used.

(26) According to each embodiment, the displayed frame image data is changed by the user operating the cross-shaped key (Step S39, Step S64, and Step S115). However, the displayed frame image data can be automatically switched and displayed. As a result, the user is not inconvenienced, and the pieces of frame image data can be enjoyed as a moving image.

In this case as well, from the frame image data to which the identifying information is attached, the frame image data picked up at a timing equivalent to the amount of lagged-timing in the acquired lagged-timing information is displayed first as the recommended image.

(27) According to the embodiments, the pieces of frame image data stored in the buffer memory are displayed individually, as at Step S36 and Step S39 in FIG. 7. However, the pieces of frame image data stored in the buffer memory can be displayed at the same time. In this case, the frame image data selected as the recommended image is distinctly displayed first from the other pieces of frame image data. When the user operates the cross-shaped key, the frame image data is selected based on the operation, and the selected frame image data is distinctly displayed from the other pieces of frame image data.

As a result, the image data picked up at the best timing can be selected from among the plurality of pieces of displayed image data.

(28) According to the embodiments, the pieces of frame image data picked up before and after the shutter button is fully depressed are stored and held in the buffer memory. However, the pieces of frame image data up to the frame image data picked up when the shutter button is fully depressed (the pieces of frame image data before the shutter button is fully depressed) can be stored and held. Alternatively, the pieces of frame image data following the frame image data picked up when the shutter button is fully depressed (the pieces of frame image data after the shutter button is fully depressed) can be stored and held.

In this case, when the pieces of frame image data before the shutter button is fully depressed are stored, the moving-image pickup process and the circulating-storage process are terminated when the user fully depresses the shutter button. When the pieces of frame image data picked up after the shutter button is fully depressed are stored, the storing process starts when the user fully depresses the shutter button.

The storing process for the pieces of frame image data picked up before the shutter button is fully depressed, the storing process for the pieces of frame image data picked up after the shutter button is fully depressed, and the storing process for the pieces of frame image data picked up before and after the shutter button is fully depressed are differentiated as follows. When the lagged-timing information to be acquired is known when the shutter button is half-depressed, the storing process for the pieces of frame image data picked up before the shutter button is fully depressed or the storing process for the pieces of frame image data picked up after the shutter button is fully depressed is performed based on the lagged-timing information. The storing process for the pieces of frame image data picked up before and after the shutter button is fully depressed is performed only when the lagged-timing information to be acquired is not known.

The user can also select any of the storing process for the pieces of frame image data picked up before the shutter button is fully depressed, the storing process for the pieces of frame image data picked up after the shutter button is fully depressed, and the storing process for the pieces of frame image data picked up before and after the shutter button is fully depressed.

As a result, unnecessary pieces of image data are not stored.

(29) According to each embodiment, when the SET key is operated, the frame image data currently being displayed is recorded as the still-time data. However, from the frame image data to which the identifying information is added, the frame image data picked up at a timing equivalent to the amount of lagged-timing in the acquired lagged-timing information can be automatically recorded as the recommended image. As a result, the image thought to be that picked up at the best timing can be easily recorded.

Aside from the frame image data automatically recorded based on the lagged-timing information, a plurality of other pieces of frame image data that has been picked up through moving-image pickup, stored and held, can be recorded as a single group. In this case, from the frame image data to which the identifying information is added, the best image information (differentiating information) is associated with the frame image data (recommended image) picked up at a timing equivalent to the amount of lagged-timing in the acquired lagged-timing information. The best image information is then recorded. The best image information indicates that the image is that picked up at the perfect moment (best timing).

In this case, when the group is selected in reproduction mode, the CPU 10 displays the plurality of pieces of image data belonging to the group in the image displaying section 15, based on the associated best image information.

For example, the image data with which the best image information is associated and recorded is displayed first, among the recorded image data. When the user operates the cross-shaped key, the CPU 10 displays other pieces of image data based on the key operation.

(30) According to each embodiment, when the SET key is operated, the currently displayed frame image data is recorded as the still-image data. However, when the same frame image data is displayed for a predetermined amount of time, the displayed frame image data can be automatically recorded.

(31) According to each embodiment, when the SET key is operated, the currently displayed frame image data is recorded as the still-image data. However, instead of only the displayed frame image data being recorded, a plurality of other pieces of frame image data that has been picked up through moving-image pickup can be recorded as a single group with the displayed frame image data. In this case, the best image information (differentiating information) is associated with the frame image data displayed when the SET key is operated, and the best image information is recorded. The best image information indicates that the image is that picked up at the perfect moment (best timing).

In this case, when the group is selected in reproduction mode, the CPU 10 displays the plurality of pieces of image data belonging to the group in the image displaying section 15, based on the associated best image information.

For example, the image data with which the best image information is associated and recorded is displayed first, among the recorded image data. When the user operates the cross-shaped key, the CPU 10 displays other pieces of image data based on the key operation.

(32) According to each embodiment, the moving-image pickup is uniformly performed, regardless of whether the moving-image pickup is performed before or after the shutter button is half-depressed. However, the subject can be imaged by the moving-image pickup process being switched to the consecutive imaging process after the shutter button is half-depressed.

Alternatively, the subject can be imaged by the consecutive imaging process in place of the moving-image pickup process, regardless of whether the process is performed before or after the shutter button is half-depressed.

(33) According to each embodiment, the lagged-timing information is the time lag, or in other words, time. However, the lagged-timing information can be the number of lagged frames instead of time. In this case, the number of lagged frames and the frame rate are required to be associated and recorded. This is because when the frame rate changes, the time lag changes even when the number of lagged frames is the same. A frame rate serving as a reference is required to be recorded.

When the frame rate does not change, or in other words, when the frame rate is flat, the frame rate is not required to be recorded. When the frame rate is the same, the number of lagged frames equals the time lag.

(34) According to each embodiment, when a condition that the shutter button be half-depressed is met, the pieces of picked-up image data are stored by circulating-storage. However, the pieces of image data can be stored under other conditions.

Other conditions are, for example, when imaging mode is selected by the user operating the mode switching key, when image recognition judges whether a subject's face is imaged or whether a front of a face is imaged during a through-image display and the face or the front of the face is judged to be imaged, when the subject appears within an AF area, when a change occurs in the image within the AF area, when a difference between the currently picked-up image data and the previously picked-up image data increases (when the subject enters the angle of view), and when an instruction is given to store the image data. The other conditions also include when a predetermined sound is recognized through a microphone by sound recognition, when a sound louder than a predetermined level is recognized through the microphone, and when the user gives a predetermined instruction.

It is only required that the image data be stored under the predetermined conditions.

(35) According to each embodiment, the CPU 10 judges whether the user fully depresses the shutter button. However, whether another condition is met can be judged instead of whether the shutter button is fully depressed. When the CPU 10 judges that the other condition is met, the identifying information can be associated with the image data picked up at the time the other condition is met and recorded. Furthermore, moving image can be picked up for a predetermined amount of time upon the other condition being met.

Other conditions are, for example, when face recognition judges that an expression on the subject's face has changed, when the subject appears within an AF area, when a change occurs in the image within the AF area, and when a difference between the currently picked-up image data and the previously picked-up image data is detected and the area in which the difference is present has moved to the center. The other conditions also include when a predetermined sound is recognized through a microphone by sound recognition, when a sound louder than a predetermined level is recognized through the microphone, and when the user gives a predetermined instruction.

It is only required that the identifying information be associated and recorded with the image data picked up when the predetermined condition is met.

(36) While the present invention has been described with reference to the preferred embodiments, it is intended that the invention be not limited by any of the details of the description therein but includes all the embodiments which fall within the scope of the appended claims.

Finally, according to the above-described embodiments, although the case of the imaging apparatus of the invention being applied to the digital camera 1 is described, this is not limited to the embodiments. It is only required that the invention be applied to a device that can consecutively image a subject.

Furthermore, although a computer program product of the imaging apparatus which is a preferred embodiment of the present invention is stored in the memory (such as a read-only memory [ROM]) of the imaging apparatus, this processing program is stored on a computer-readable medium and should also be protected in the case of manufacturing, selling, etc., of only the program. In that case, the method of protecting the program with a patent will be realized in the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
a consecutive imaging controlling section which consecutively images a subject;
a timing indicating section which allows a user to indicate an arbitrary timing;
an image acquiring section which acquires a plurality of pieces of image data picked up by the consecutive imaging controlling section based on the timing indicated by the timing indicating section;
an acquiring section which acquires an imaging situation;
a frame rate selecting section which allows the user to select a frame rate at which the consecutive imaging is performed by the consecutive imaging controlling section;
a lagged-timing information acquiring section which acquires lagged-timing information based on the imaging situation acquired by the acquiring section and based on the frame rate selected by the frame rate selecting section; and
a controlling section which, based on the arbitrary timing indicated by the timing indicating section and based on the lagged-timing information acquired by the lagged-timing information acquiring section, specifies a piece of image data from among the plurality of pieces of image data acquired by the image acquiring section.

2. The imaging apparatus according to claim 1, further comprising:
a plurality of imaging scenes; and
an imaging scene selecting section which allows the user to select an imaging scene from among the plurality of imaging scenes;
wherein the acquiring section includes a section which acquires the imaging scene selected by the imaging scene selecting section as the imaging situation.

3. The imaging apparatus according to claim 2, further comprising an imaging condition table in which imaging conditions corresponding to each of the plurality of imaging scenes are recorded;
wherein the consecutive imaging controlling section acquires the imaging conditions corresponding to the imaging scene selected by the imaging scene selecting section from the imaging condition table and performs imaging under the acquired imaging conditions.

4. The imaging apparatus according to claim 1, further comprising a movement amount detecting section which detects an amount of movement by the subject based on the image data picked up by the consecutive imaging controlling section;
wherein the acquiring section includes a section which acquires the amount of movement detected by the movement amount detecting section as the imaging situation.

5. The imaging apparatus according to claim 1, wherein the image acquiring section acquires the plurality of pieces of image data imaged by the consecutive imaging controlling section at least one of before and after the timing indicated by the timing indicating section.

6. The imaging apparatus according to claim 1, further comprising a table in which lagged-timing information corresponding to each imaging situation and each frame rate is recorded;
wherein the lagged-timing information acquiring section acquires the lagged-timing information corresponding to the imaging situation acquired by the acquiring section and the frame rate selected by the frame rate selecting section from the table.

7. The imaging apparatus according to claim 6, further comprising:
a selecting section which allows the user to select an arbitrary piece of image data from among the plurality of pieces of image data acquired by the image acquiring section; and
a record update controlling section which updates a record of the lagged-timing information recorded in the table corresponding to the imaging situation acquired by the acquiring section and the frame rate selected by the frame rate selecting section, based on a lag between a timing at which the arbitrary piece of image data selected by the selecting section is picked up by the consecutive imaging controlling section and the timing indicated by the timing indicating section.

8. The imaging apparatus according to claim 1, wherein the controlling section includes a display controlling section which controls display of the plurality of pieces of image data acquired by the image acquiring section, based on the specified piece of image data.

9. The imaging apparatus according to claim 8, wherein the display controlling section displays the specified piece of image data first, by itself.

10. The imaging apparatus according to claim 8, wherein the display controlling section displays the plurality of pieces of image data acquired by the image acquiring section at a same time and distinctly displays the specified piece of image data.

11. The imaging apparatus according to claim 9, further comprising an image specifying section which allows the user to specify an arbitrary piece of image data from among the plurality of pieces of image data acquired by the image acquiring section;
wherein when the arbitrary piece of image data is specified by the image specifying section, the display controlling section changes the specified piece of image data displayed first by itself to the specified arbitrary piece of image data and displays the changed image data.

12. The imaging apparatus according to claim 10, further comprising an image specifying section which allows the user to specify an arbitrary piece of image data from among the plurality of pieces of image data acquired by the image acquiring section;
wherein when the arbitrary piece of image data is specified by the image specifying section, the display controlling section changes the specified piece of image data distinctly displayed to the specified arbitrary piece of image data and displays the changed image data.

13. The imaging apparatus according to claim 7, further comprising a recording controlling section which records the arbitrary piece of image data selected by the selecting section in a recording section.

14. The imaging apparatus according to claim 1, wherein the controlling section includes a recording controlling section which controls recording of the plurality of pieces of image data acquired by the image acquiring section, based on the specified piece of image data.

15. The imaging apparatus according to claim 14, wherein the recording controlling section records only the specified piece of image data.

16. An imaging method comprising:
consecutively imaging a subject;
allowing a user to indicate an arbitrary timing;
acquiring a plurality of pieces of image data picked up by the consecutive imaging of the subject based on the indicated arbitrary timing;
acquiring an imaging situation;
allowing the user to select a frame rate at which the consecutive imaging is performed;
acquiring lagged-timing information based on the acquired imaging situation and based on the selected frame rate; and
specifying a piece of image data from among the acquired plurality of pieces of image data based on the indicated arbitrary timing and the acquired lagged-timing information.

17. A non-transitory computer-readable storage medium having a program stored thereon that is executable by a computer of an imaging apparatus, the program controlling the imaging apparatus to perform functions comprising:
consecutively imaging a subject;
allowing a user to indicate an arbitrary timing;
acquiring a plurality of pieces of image data picked up by the consecutive imaging of the subject based on the indicated arbitrary timing;
acquiring an imaging situation;
allowing the user to select a frame rate at which the consecutive imaging is performed;
acquiring lagged-timing information based on the acquired imaging situation and based on the selected frame rate; and
specifying a piece of image data from among the acquired plurality of pieces of image data based on the indicated arbitrary timing and the acquired lagged-timing information.

18. The imaging apparatus according to claim 1, further comprising:
an identifying information adding section which adds identifying information to a piece of image data picked up at the timing indicated by the timing indicating section, from among the plurality of pieces of image data acquired by the image acquiring section;
a number-of-lagged-frames calculating section which calculates a number of lagged frames based on the frame rate selected by the frame rate selecting section and based on the lagged-timing information acquired by the lagged-timing information acquiring section; and
a recommended image selecting section which selects a recommended piece of image data from among the plurality of pieces of image data acquired by the image acquiring section, based on the piece of image data to which the identifying information is added by the identifying information adding section and based on the number of lagged frames calculated by the number-of-lagged-frames calculating section;
wherein the controlling section performs a predetermined process using the recommended piece of image data selected by the recommended image selecting section.

* * * * *

UNITED STATES PATENT AND TRADEMARK OFFICE
CERTIFICATE OF CORRECTION

PATENT NO. : 8,817,133 B2  
APPLICATION NO. : 13/089098  
DATED : August 26, 2014  
INVENTOR(S) : Takashi Onoda et al.

Page 1 of 1

It is certified that error appears in the above-identified patent and that said Letters Patent is hereby corrected as shown below:

On the Title page, below Item (65) Prior Publication Data, insert --Related U.S. Application Data

(62) Division of application No. 11/978,902, filed on October 30, 2007 now Pat. No. 7,948,526--.

Signed and Sealed this
Seventeenth Day of February, 2015

Michelle K. Lee
*Deputy Director of the United States Patent and Trademark Office*